US010320495B2

(12) United States Patent
Tessandori et al.

(10) Patent No.: US 10,320,495 B2
(45) Date of Patent: Jun. 11, 2019

(54) METHOD OF CHARACTERIZING THE PERFORMANCE OF A PAYLOAD OF A SATELLITE IN ORBIT AND ASSOCIATED IOT SYSTEM

(71) Applicant: THALES, Courbevoie (FR)

(72) Inventors: Stéphane-Olivier Tessandori, Cannes la Bocca (FR); Emmanuel Bousquet, Toulouse (FR); Arnaud-Damien Durand, Tournefeuille (FR)

(73) Assignee: THALES, Courbevoie (FR)

( * ) Notice: Subject to any disclaimer, the term of this patent is extended or adjusted under 35 U.S.C. 154(b) by 209 days.

(21) Appl. No.: 15/347,560

(22) Filed: Nov. 9, 2016

(65) Prior Publication Data

US 2017/0134103 A1     May 11, 2017

(30) Foreign Application Priority Data

Nov. 10, 2015  (FR) ...................... 15 02356

(51) Int. Cl.
*H04B 17/10*  (2015.01)
*H04B 7/185*  (2006.01)
(Continued)

(52) U.S. Cl.
CPC ....... *H04B 17/102* (2015.01); *H04B 7/18504* (2013.01); *H04B 7/18515* (2013.01);
(Continued)

(58) Field of Classification Search
CPC ............. H04B 17/102; H04B 7/18504; H04B 7/18515; H04B 7/18519; H04B 7/155;
(Continued)

(56) References Cited

U.S. PATENT DOCUMENTS

2009/0201084 A1\*  8/2009  See ...................... H03F 1/0244
330/51
2013/0272152 A1  10/2013  Le Pera et al.
(Continued)

FOREIGN PATENT DOCUMENTS

FR     2989545 A1    10/2013
FR     2995478 A1    3/2014

OTHER PUBLICATIONS

Arthur F. Standing, et al., "The Techniques and Accuracies of In-Orbit Measurements on Satellites", Proceedings of Southeast Conference Institute of Electrical and Electronics Engineers, Apr. 7, 1991, pp. 405-409, IEEE, New York, USA, XP010045130.

*Primary Examiner* — Walter J Divito
*Assistant Examiner* — Anthony Luo
(74) *Attorney, Agent, or Firm* — Baker & Hostetler LLP

(57) ABSTRACT

A method of characterizing the performance of the payload of a satellite in orbit is executed with the aid of a test ground station including first radio-frequency amplification means and a radio-frequency transmit ground antenna. The method includes a step of providing first amplification means that can be configured to generate at the input of the transmit ground antenna a wide-band test thermal noise the power spectral density of which can be adjusted to a test thermal noise reference power spectral density Dref so that the ratio of the test thermal noise spectral density received at the input of the transponder and that corresponds to it to the thermal noise floor spectral density generated by the satellite alone internally and the natural thermal noise of the Earth is greater than or equal to a first threshold Ds1 equal to 10 dB. An IOT system is configured to execute the method.

14 Claims, 9 Drawing Sheets

(51) Int. Cl.
H04W 72/04 (2009.01)
H04B 7/155 (2006.01)
H04W 24/08 (2009.01)

(52) U.S. Cl.
CPC ........ *H04B 7/18519* (2013.01); *H04W 24/08* (2013.01); *H04W 72/042* (2013.01); *H04W 72/0413* (2013.01); *H04B 7/155* (2013.01)

(58) Field of Classification Search
CPC  H04W 72/0413; H04W 72/042; H04W 24/08
See application file for complete search history.

(56) References Cited

U.S. PATENT DOCUMENTS

| | | | | |
|---|---|---|---|---|
| 2013/0293414 | A1* | 11/2013 | Robinson | G01S 19/05 342/357.25 |
| 2014/0073239 | A1* | 3/2014 | Tessandori | H04B 7/18519 455/9 |
| 2015/0355334 | A1* | 12/2015 | Stubbs | G01S 19/02 342/357.395 |
| 2015/0365116 | A1* | 12/2015 | Henderson | H04B 1/1036 455/63.1 |

* cited by examiner

METHOD OF CHARACTERIZING THE PERFORMANCE OF A PAYLOAD OF A SATELLITE IN ORBIT AND ASSOCIATED IOT SYSTEM

CROSS-REFERENCE TO RELATED APPLICATION

This application claims priority to foreign French patent application no. FR 1502356, filed Nov. 10, 2015, the disclosure of which is incorporated by reference in its entirety.

FIELD OF THE INVENTION

The present invention concerns a method of characterizing the performance of a payload of a satellite in orbit, notably in its service orbit, using an IOT (In Orbit Testing) ground station. The invention more particularly concerns the characterization of the receive antenna and/or the transmission subsystem of the receive uplink of the payload tested in service orbit.

BACKGROUND

When the nominal operation of a receive antenna of a satellite in orbit is tested, the radiation pattern of the receive antenna is tested and compared to expected operating specifications.

The invention is applied in particular for the in orbit testing of a telecommunication satellite but also any satellite the payload of which is made up of an uplink receive antenna, a downlink transmit antenna, and at least one transparent transponder (bent pipe transponder) connected between the uplink receive antenna and the downlink transmit antenna or the payload of which is made up of an uplink receive antenna, a transmit antenna and at least one regenerative transponder having at least one power telemetry measurement on its uplink transmission subsystem representing the input power of the transponder.

The known methods of testing the payload of a satellite in orbit are most often based on the use of a test signal on an unmodulated carrier, i.e. a sinusoidal signal, sometimes called a pure carrier. This test signal is generated, amplified and transmitted on the uplink via a ground station having a transmit ground antenna. The payload of the satellite receives the unmodulated test signal via an uplink receive antenna, the signal is propagated through the transponder and retransmitted to the ground station via a downlink transmit antenna. From measurements carried out on the downlink signal when the transponder operates in linear and transparent mode it is possible to characterize the response of the receive antenna of the satellite.

It is also known to employ unmodulated test signals in the form of multi-carrier test signals to test the operation of a multibeam receive antenna or a multi-frequency receive antenna, i.e. to generate at the same time a plurality of sinusoidal pure carriers distributed across a band of frequencies.

The known test methods based on the use of unmodulated test signals and described above have many disadvantages.

A first technical problem is raised by the limitation of the testing of the receive antenna of the satellite to a portion of the coverage area of the transmit antenna. In fact, for the test method to be used, the test ground station, which at the same time transmits the test signal on the uplink and acquires the signal retransmitted transparently by the satellite on the downlink, must be positioned in the area of intersection of the coverage areas of the receive antenna and the transmit antenna of the satellite. It is therefore not possible to test the receive antenna throughout its angular coverage.

A second technical problem is linked to the use of test signals intended to test the operation of a multibeam receive antenna or a multi-frequency receive antenna. This necessitates the generation of multi-carrier test signals and a device for generating those signals that increases the complexity of the test system.

Finally, and generally, when one or more unmodulated test carriers are transmitted by the test ground station, a third technical problem is caused by the existence of interference created by the ground station with other adjacent and operational satellites, which interference is harmful and unacceptable for those adjacent satellites in service and necessitate global frequency coordination and consequently specific arrangements for the IOT measurements.

In fact, the high power spectral density of one or more unmodulated carriers, which can be as high as approximately 70 dB above that of a modulated carrier, leads to severe frequency coordination constraints.

Of the specific approaches to global frequency coordination, a first approach consists in choosing an in orbit test (IOT) longitude of the satellite under test different from the final service orbital position so that the satellite under test does not interfere with adjacent satellites in service. This approach is sometimes suitable and in particular suits a geostationary satellite.

A second approach to the IOT measurements consists in choosing test time periods during the night to limit the effects of interference on the adjacent satellites, the traffic of which may be reduced during these nocturnal periods.

A third arrangement consists in performing the IOT measurements using test frequencies offset relative to the service frequencies of the satellite under test and that lie within the guard bands of the adjacent satellites.

However, such arrangements are costly and take a long time to implement, as well as limiting the IOT measurements that it is required to carry out in terms of the ranges of the parameters that it is required to characterize, the number of configurations of the payload tested, and the duration of the measurements, and can even prevent the carrying out of some IOT measurements.

SUMMARY OF THE INVENTION

The present invention aims firstly to alleviate the difficulties caused by the third technical problem and to propose an IOT method and system that provide a simple way to make it possible to characterize the payload of the satellite under test via its uplink in the service orbital position of the satellite, in particular to characterize the radiation pattern of the uplink receive antenna, at the same time as meeting the requirements for coordination of frequencies with other adjacent or more closely adjoining satellites.

Additionally, and secondly, the present invention aims to alleviate the difficulties caused by the first and second technical problems, and to propose an IOT method and system that make it possible to widen the characterization angular range of the radiation pattern of the uplink receive antenna and, when a plurality of channels are tested in parallel, for example during multi-frequency sections of the directivity of the receive antenna of the payload (this is known as IOT Antenna mapping), to reduce the duration of the IOT measurements or the complexity of a dedicated multi-carrier test bench.

To this end, the invention consists in a method of characterizing the performance of a payload of a satellite in orbit using a test ground station, the test ground station including first radio-frequency amplification means, and a radio-frequency transmit ground antenna with a first input port of the antenna connected to the output of the first radio-frequency amplification means, the payload of the satellite including a first receive satellite antenna for the uplink, a second transmit satellite antenna for the downlink, and a transponder connected between the first receive satellite antenna and the second transmit satellite antenna, the transponder including a second radio-frequency input port connected to an output port of the receive satellite antenna, and second amplification means, configured to amplify in an input portion of the uplink transponder or in the whole of the transponder signals in a receive frequency band of the transponder, according to a linear amplification mode and with a fixed gain that can be remote-controlled included in a gain range varying between a first lower gain Gmin and a second higher gain Gmax inclusive, the method being characterized in that it comprises a supply step consisting in: providing the first amplification means that can be configured to generate at the input of the transmit ground antenna a test thermal noise having a bandwidth greater than or equal to the receive band of the transponder and the power spectral density of which can be adjusted to a test thermal noise reference power spectral density Dref such that the ratio of the spectral density of the test thermal noise, received from the test ground station when the thermal noise spectral density that it transmits is equal to the reference spectral density Dref, and received at the input of the transponder, to the thermal noise floor spectral density generated by the satellite alone internally and the natural thermal noise of the Earth at the input of the transponder is greater than or equal to a first threshold Ds1 equal to 10 dB.

According to particular embodiments, the IOT method has one or more of the following features:

a test bench remote from or integrated into the test ground station is configured to send and to receive, respectively, configuration telecommands and telemetry measurements from the satellite via a telecommand and telemetry measurement infrastructure, ending at a telecommand and telemetry measurement station visible from the satellite, and to send to and to receive from the test ground station commands of first amplification means and the test thermal noise retransmitted by the satellite with or without processing, the method further comprising the steps consisting in: configuring the attitude of the satellite and/or of the receive satellite antenna so that the receive antenna points toward the ground station according to a reference pointing angular position; configuring the second amplification means of the payload at a predetermined fixed gain that corresponds to a linear mode of operation in at least the input portion of the transponder corresponding to the uplink or in the whole of the transponder when the test thermal noise received from the ground station and at the input of the transponder corresponds to a test thermal noise spectral density transmitted by the ground station equal to the reference spectral density Dref; configuring the first amplification means of the test ground station to generate at the input of the transmit ground antenna a test thermal noise having a band covering the receive band of the transponder and the power spectral density of which is equal to the reference spectral density Dref, and to have the test thermal noise transmitted by the test ground station in this configuration of the first amplification means; then during a predetermined time period, acquiring at least one measurement representing the power received at the input of the transponder via at least one corresponding received power measurement either by the test ground station via the downlink when there exists an area of intersection of the coverage areas of the receive antenna and the transmit antenna of the satellite and the ground station is inside said intersection area; or by corresponding telemetry measurements of the received power at a location of the transponder where the amplification is linear and where the corresponding gain is incidentally known;

the bandwidth of the test thermal noise transmitted to the satellite is between 30 MHz and 3 GHz inclusive or between 3% and 10% inclusive of a central frequency of the transmit frequency band of the test ground station or the receive frequency band of the payload;

the transmit frequency band of the test ground station, respectively the receive band of the payload, is in bands L, S, C, X, Q, V, Ku and Ka;

the first noise density ratio threshold Ds1 depends on the receive frequency band of the payload, the orbit of the satellite, the size of the transmit antenna of the test ground station and the G/T parameter of the payload of the satellite under test;

the characterization of the performance of the payload of the satellite in service orbit is included within the combination of: the single-frequency or multi-frequency characterization of one or more radiation angular diagrams and/or of one or more radiation angular sections of the receive antenna of the satellite when the payload transponder is a transparent transponder or a regenerative transponder; the linear gain response from the input port to the output port of the transponder when the transponder is a transparent transponder operating in a linear mode and when there exists an area of intersection of the coverage areas of the receive antenna and of the transmit antenna of the satellite and the ground station is in the said intersection area; the variation of the linear gain of the transponder as a function of frequency in the band of the transponder for a fixed gain of the transponder; the measurement of the saturating flux or of the saturating flux density (SFD) of the transponder of the satellite and the measurement of the effective isotropic radiated power (EIRP) of the payload when the transponder is transparent; the measurement of the G/T of the payload with or without visibility of the downlink from the ground station; the characterization of the RF power withstanding of the payload and/or the consumption and/or the performance of the platform when the payload is loaded by the thermal noise received in a configuration close to the operational conditions, for example in accordance with a maximum traffic or a traffic variable in time;

the characterization of the payload is the characterization of an angular diagram or of angular sections of variation of the directivity of the receive satellite antenna, and the method comprises the steps consisting in: configuring the attitude of the satellite and/or of the receive satellite antenna so that the receive satellite antenna points toward the test ground station according to a reference pointing angular position; configuring the second amplification means of the payload at a predetermined first fixed gain that corresponds to a linear mode of operation in the input portion of the transponder corresponding to the uplink or in the whole of the transponder when the test thermal noise received from the ground station and at the input of the transponder corresponds to a test thermal noise spectral density transmitted by the ground station equal to the reference spectral density Dref; configuring the first amplification means of the ground station to generate at the input of the transmit ground antenna a test thermal noise having a bandwidth greater than or equal to that of the receive band of the transponder and the power spectral density of which is equal to the reference spectral density Dref; the ground station then generating during a predetermined time period the test thermal noise corresponding to the configuration of the first amplification means at the reference spectral density Dref when the receive satellite antenna points to the ground station according to the reference pointing direction; then measuring a reference level corresponding to the reference pointing direction from the test thermal noise signal retransmitted by the payload on the downlink and received by the ground station via a receive ground antenna when there exists an area of intersection of the coverage areas of the receive antenna and of the transmit antenna of the satellite and the ground station is in the said area of intersection, or from a telemetry measurement from the satellite supplying the power level received at a location of the transponder at which the amplification is linear and where the gain as far as that location is incidentally known; then depointing the receive antenna relative to the reference pointing direction over a set of depointing angular positions of the receive antenna relative to the reference pointing direction; and for each depointing angular position generating on the ground during a predetermined time period the test thermal noise covering the receive band of the transponder and corresponding to the configuration of the first amplification means at the reference density Dref; and measuring during a predetermined time period on one or more frequencies from the band of the transponder the relative directivity or the relative gain of the receive satellite antenna relative to the reference level corresponding to the depointing angular position of the receive satellite antenna based on the test thermal noise signal retransmitted by the payload on the downlink and received by the ground station via a receive ground antenna when there exists an area of intersection of the coverage areas of the receive antenna and of the transmit antenna of the satellite and the ground station is in the said intersection area, or from a telemetry measurement from the satellite supplying the receive power level at a location of the transponder where the amplification is linear and the gain as far as that location is known; storing the commanded depointing angular offsets of the receive satellite antenna and the associated relative directivity or relative gain measurements; then from the commanded depointing angular offsets of the receive satellite antenna and the associated single-frequency or multi-frequency relative directivity or relative gain measurements, reconstituting one or more angular diagrams of variation of the directivity of the receive satellite antenna and/or one or more angular sections of variation of the directivity of the receive satellite antenna;

the transponder is a transparent transponder and the characterization of the payload is the characterization of the gain response of the transponder from its input end to its output end over the receive band of the transponder following a predetermined gain command to the second amplification means for which the transponder operates in linear mode when the test ground station generates a test thermal noise the power spectral density of which is equal to the reference power spectral density Dref; and the method comprises the steps consisting in: pointing the receive satellite antenna at the test ground station according to a reference pointing direction; then configuring the second amplification means to fix the gain of the transponder at the predetermined gain value compatible with linear operation of the transponder when the ground station transmits the test thermal noise at the reference power spectral density Dref; and configuring the first amplification means of the ground station to generate a thermal noise at the input of the transmit antenna covering the band of the transponder and causing the power spectral density of the test thermal noise to be varied in steps of predetermined duration in a range of attenuation relative to the reference spectral density Dref between 0 dB and a backoff value less than or equal to the first threshold Ds1 inclusive; and over the swept set of the power densities of the thermal noise generated by the station, correlatively measuring the powers at the input of the transponder and the corresponding powers at the output of the transponder and deducing therefrom the evolution of the gain as a function of the input power of the transponder;

the transponder is a transparent transponder; and the characterization of the payload is the characterization of the frequency response of the gain over the entire band of the transponder following the same predetermined gain command applied to the second amplification means for which the transponder operates in linear mode when the ground station generates a test thermal noise the power spectral density of which is equal to the reference power spectral density Dref; and the method comprises the steps consisting in: pointing the receive satellite antenna at the test ground station according to a reference pointing direction; then configuring the second amplification means to fix the gain of the transponder at a predetermined gain value compatible with linear operation of the transponder when the test ground station transmits the test thermal noise at the reference power spectral density; and configuring the first amplification means of the test ground station to generate a thermal noise at the input of the transmit ground antenna covering the receive band of the transponder at the reference power spectral density Dref; over a set of frequencies swept in steps of predetermined duration, correlatively measuring, the transmitted and received spectral densities as a function of frequency by the ground station via the receive ground antenna when there exists an area of intersection of the coverage areas of the receive antenna and of the transmit antenna of the satellite and the ground station is in the latter; then deducing therefrom the gain variation as a function of frequency in the receive band of the transponder;

the transponder is a transparent transponder; and the characterization of the payload is the characterization of the saturating flux or of the saturating flux density (SFD) of the transponder of the satellite and/or the measurement of the effective isotropic radiated power (EIRP) of the payload; and the method comprises the steps consisting in: pointing the receive antenna of the satellite at the ground station according to a reference pointing direction; then configuring the second amplification means to cause the transponder to operate in a linear amplification regime when the power spectral density of the test thermal noise injected at the input of the transmit ground antenna is less than or equal to the reference power spectral density Dref; configuring the first amplification means of the ground station to generate a test thermal noise at the input of the transmit ground antenna covering the receive band of the transponder and causing the test thermal noise power spectral density to vary in steps of predetermined duration in a range of attenuation relative to the reference spectral density Dref between 0 dB and a backoff value less than or equal to the first threshold Ds1 inclusive; and over the swept set of power densities of the thermal noise generated by the ground station correlatively measuring either the corresponding input and output powers of the transponder via satellite telemetry measurements, or the input powers of the transponder via measurement at the level of the ground station or via the satellite telemetry measurement and the corresponding powers received by the ground station via the receive ground antenna when there exists an area of intersection of the coverage areas of the receive antenna and of the transmit antenna of the satellite and the ground station is in said intersection area, and deducing therefrom the evolution of the effective isotropic radiated power (EIRP) of the payload as a function of the input power received by the transponder over a first observation range; and/or the method comprises the steps consisting in: configuring the first amplification means to fix the spectral density of the test thermal noise injected at the input of the transmit ground antenna and covering the total band of the transponder at the reference power spectral density Dref; then configuring the second amplification means of the transponder by causing the linear gain of the transponder to vary in steps of predetermined duration in a range of gains of the transponder between the first lower gain value Gmin and the second higher gain value Gmax inclusive to cause the transponder to operate in a non-linear mode in which a high-power amplifier forming one end of the second amplification means is compressed; and over the swept set of the linear gain commands of the transponder correlatively measuring either the corresponding input and output powers of the transponder via satellite telemetry measurements, or the input powers of the transponder via measurement at the level of the ground station or via the satellite telemetry measurement and the corresponding powers received by the ground station via the receive ground antenna when there exists an area of intersection of the coverage areas of the receive antenna and of the transmit antenna of the satellite and the ground station is in said area of intersection, and deducing therefrom the evolution of the effective isotropic radiated power (EIRP) of the payload as a function of the gain of the transponder and the input power received at the input of the transponder corresponding to a spectral density of the test thermal noise transmitted to the ground equal to the reference spectral density Dref and/or to the saturating flux density (SFD);

the characterization of the payload is a measurement of the G/T in which G designates the gain of the antenna and T designates the noise temperature referred to the input of the transponder; and when the transponder is transparent and there exists no intersection between the uplink coverage and the downlink coverage or the transponder is regenerative, the method comprises the steps consisting in: pointing the receive antenna of the satellite at the ground station according to a reference pointing direction; switching off or leaving switched off the transmission of radio-electric signals by the ground station; then configuring the second amplification means of the transponder at a gain value compatible with linear operation of the transponder and a measurement of noise via a satellite telemetry measurement; then measuring the thermal noise N1 inherent to the transponder present at the input of the transponder via the input telemetry measurement of the transponder; then activating the ground station and configuring the first amplification means to generate a test thermal noise the spectral density of which measured on the ground is greater than or equal to the reference density Dref; then measuring a received thermal noise N2 coming from the ground station and at the input of the transponder in the receive band of the transponder via the input telemetry measurement of the transponder; determining the ratio G/T from the ratio of the received thermal noise N2 to the thermal noise N1 inherent to the transponder;

the characterization of the payload is a measurement of the G/T in which G designates the gain of the antenna and T designates the noise temperature referred to the input of the transponder; and when the transponder is transparent and there exists an intersection between the uplink coverage and the downlink coverage, the method of measuring the G/T comprises the steps consisting: pointing the receive antenna of the satellite at the ground station according to a reference pointing direction; switching off or leaving switched off the transmission of radio-electric signals by the ground station; then configuring the second amplification means of the transponder at a gain value compatible with linear operation of the transponder; then measuring the inherent thermal noise N1 on the downlink; then activating the ground station and configuring the first amplification means to generate a test thermal noise the spectral density of which measured on the ground is greater than or equal to the reference density Dref; then measuring a thermal noise N2 received on the downlink; then determining the ratio G/T from the ratio of the measured thermal noise N2 to the inherent thermal noise N1 of the transponder.

The invention also consists in a system for characterizing the performance of a payload of a satellite in orbit over a frequency band and on an uplink, the payload of the satellite including a first receive satellite antenna for the uplink, a second transmit satellite antenna for the downlink, and a wide-band transponder connected between the first receive satellite antenna and the second transmit satellite antenna, the transponder including a second radio-frequency input port connected to an output port of the receive satellite antenna, and second amplification means, configured to amplify in an input portion of the uplink transponder or in the whole of the transponder signals in the frequency band, according to a linear amplification mode and with a fixed gain that can be telecommanded included in a gain range varying between a first lower gain Gmin and a second higher gain Gmax inclusive, and the system comprising: a test ground station including first radio-frequency amplification means and a radio-frequency transmit ground antenna with an input port connected to an output of the first amplification means; a telecommand and telemetry measurement infrastructure of the payload and of the satellite platform terminated by a telecommand and telemetry measurement station visible from the satellite; and a test bench connected to the test ground station and to the telecommand and telemetry measurement infrastructure configured to implement the method defined above of characterizing the payload by coordinating the sending of commands and the reception of signals to be measured and/or telemetry measurements respectively sent and received from the test ground station and from the telecommand and telemetry measurement station; the system being characterized in that in that: the first amplification means of the ground station can be configured to generate at the input of the transmit ground antenna a test thermal noise having a bandwidth greater than or equal to the receive band of the receiver and the power spectral density of which can be adjusted to a reference power spectral density Dref such that the ratio of the density of the test thermal noise received from the test ground station when it transmits is equal to the reference spectral density Dref, and received at the input of the transponder, to the thermal noise floor spectral density generated by the satellite alone internally and by the natural thermal noise of the Earth at the input of the transponder, is greater than or equal to a first threshold Ds1 equal to 10 dB.

According to particular embodiments, the system for characterizing the performance of a payload has one or more of the following features:

the test bench comprises: means for acquiring during a predetermined time period the thermal noise transmitted by the transmit satellite antenna on the downlink received by the test ground station when there exists an area of intersection of the coverage areas of the receive antenna and of the transmit antenna of the satellite and the ground station is in said intersection area, and/or telemetry measurements of the test thermal noise received at various locations of the transponder, and telemetry measurements from the platform representing the RF power withstanding of the payload and/or the electrical consumption and/or the thermal performance of the platform when the payload is loaded by test thermal noise in a configuration close to the operational conditions, for example that of a maximum traffic or a traffic variable in time; means for telecommanding the payload and/or the platform of the satellite in service orbit, during said predetermined time period, to impart a pointing angular offset of the receive satellite antenna relative to a reference pointing direction of predetermined variation and/or to vary a linear gain of the transponder when it is in a linear amplification mode or to command a non-linear amplification mode of the transponder by activating an automatic gain control loop at the input of an output high-power amplifier; means for storing variations commanded by the telecommand means of the test bench; correlation means for correlating the measurement of the signal by the transmit satellite antenna on the downlink of the satellite when there exists an area of intersection of the coverage areas of the receive antenna and of the transmit antenna of the satellite and the ground station is located in the latter, and/or telemetry measurements of the test signal received at various locations of the transponder; and/or other satellite parameters related to the payload representing the RF power withstanding of the payload, and performance in terms of consumption and thermal regulation of the platform, and for deducing therefrom the measured parameter variations characterizing the payload or the platform as a function of the variations commanded to the satellite.

BRIEF DESCRIPTION OF DRAWINGS

The invention will be better understood on reading the following description of embodiments given by way of example only and with reference to the drawings, in which.

DETAILED DESCRIPTION

Figure 1:
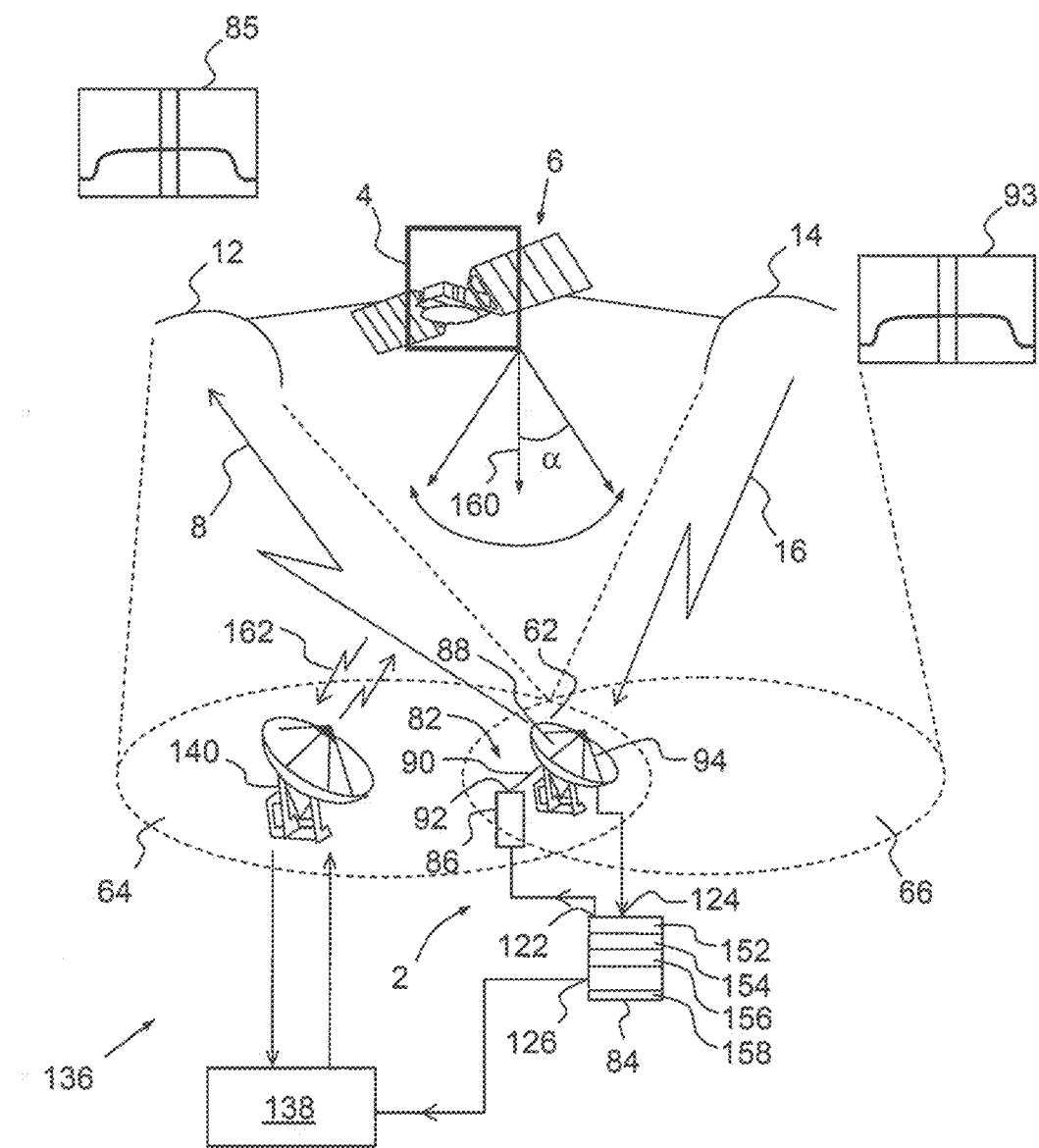
FIG. 1 is a view of an example of the architecture of an IOT system according to the invention configured to characterize the performance of the payload of a satellite in its service orbit.

According to FIG. 1, an IOT (In Orbit Testing) system 2 is configured to characterize the performance of a payload 4 of a satellite 6 tested over a band of receive frequencies which is that of an uplink 8. The tests are intended to be carried out when the satellite 6 under test is in a predetermined orbit, notably its service orbit. Here the satellite 6 is assumed to be in a geostationary orbit.

Alternatively, the satellite occupies an orbit in the set comprising Medium Earth Orbits (MEO), Low Earth Orbits (LEO).

Figure 2:
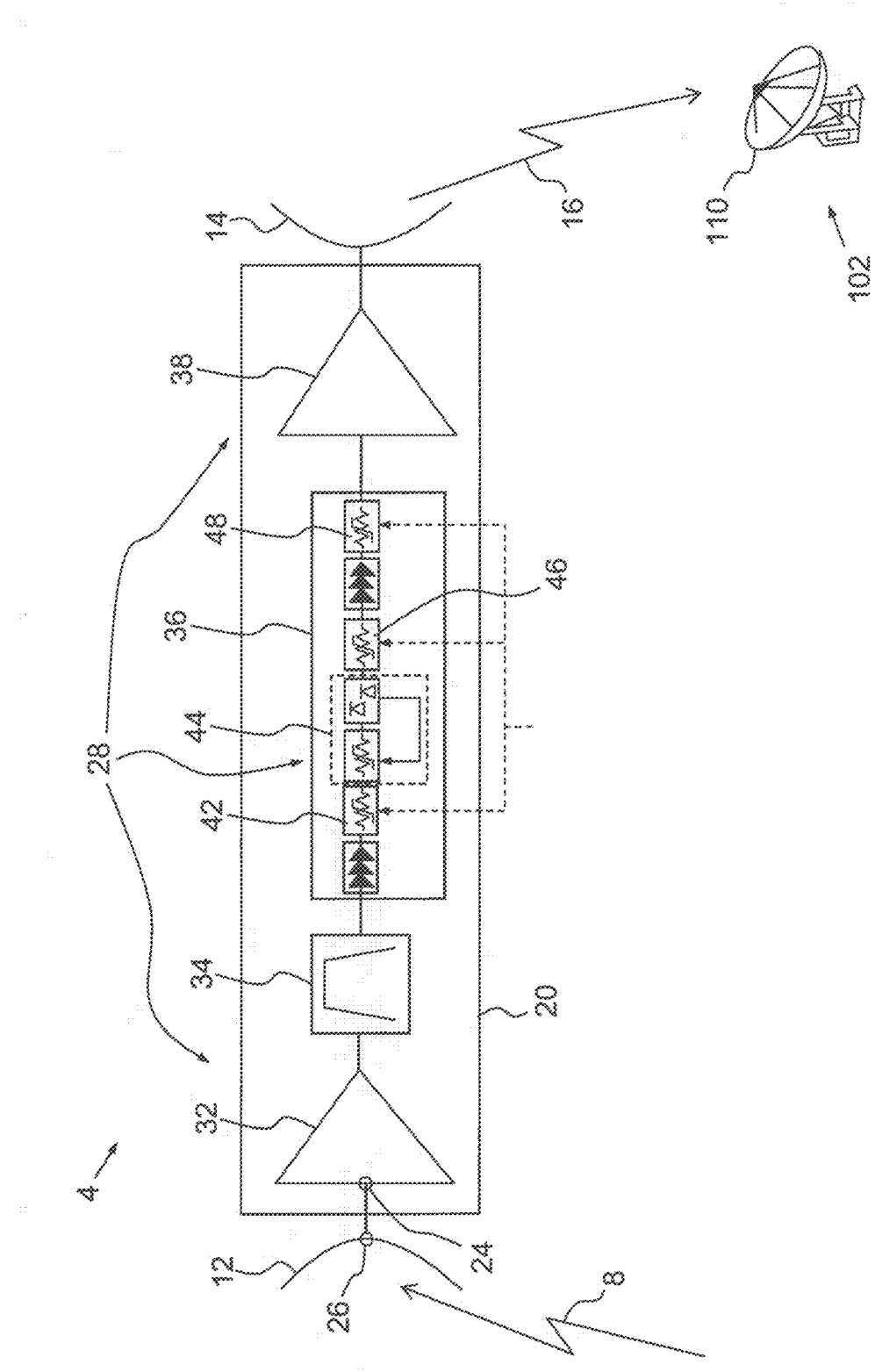
FIG. 2 is a view of a simplified example of a payload tested by the IOT system from FIG. 1.

According to FIG. 2 and a simplified payload example, the payload 4 of the satellite 6 includes a first receive satellite antenna 12 for the uplink 8, a second transmit satellite antenna 14 for the downlink 16, and a transponder 20, here having a wide receive band, connected between the first receive satellite antenna 12 and the second transmit satellite antenna 14.

The transponder 20 includes a radio-frequency input port 24 connected to an output port 26 of the receive satellite antenna 12 and second amplification means 28 configured to amplify in an input portion of the transponder corresponding to the uplink 8 or in the whole of the transmission subsystem of the transponder signals contained in the receive frequency band of the transponder in a linear amplification mode and with a fixed gain that can be telecommanded contained in a gain range varying between a first lower gain Gmin and a second higher gain Gmax inclusive.

The second amplification means 28 comprise, connected directly to the output of the receive satellite antenna 12, an LNA (Low Noise Amplifier) 32 and then, in cascade, via a channel filter 34 defining the transponder as a wide-band transmission channel, firstly an intermediate amplification subsystem 36, then an HPA (High Power Amplifier) 38. The payload 4 made up in this way here performs a transparent transponder function (bent pipe transponder) whereby the signal received on the uplink 8 is retransmitted after amplification and frequency transposition throughout the band of the transponder on the downlink 16 of the satellite 4 via the transmit satellite antenna 16. In the FIG. 2 example, a single transponder is represented, but a payload may contain a plurality of transponders associated with a plurality of different receive and/or transmit frequencies.

When no signal is received by the receive satellite antenna 12, the payload 4 nevertheless generates noise that has two main components, a first noise component coming from the natural thermal radiation of the Earth, transmitted to the payload by the receive satellite antenna 12 and potentially containing interference coming from adjacent satellite systems, and a second thermal noise component generated by the transponder itself, in particular the low noise receive subsystem or LNA 32.

There are described next in more detail one embodiment of the intermediate amplification subsystem 36 and the respective associated configurations that enable characterization of the payload in a portion of the transponder corresponding to the uplink subsystem, for example characterization of the performance of the receive antenna 12, and to make characterization of the payload over the whole of the transmission subsystem of the transponder possible.

The intermediate amplification subsystem 36 includes at least one first amplifier 42 that makes it possible to adjust the output signal level of the channel filter 34 so that it is compatible with the dynamic range of an automatic gain control loop 44 placed at the output of the first amplifier 42. The automatic gain control loop 44 makes it possible to obtain a signal of constant level at the input of a second amplifier 46 that is adapted to amplify the signal to achieve the required operating point at the input of the high-power amplifier 38. A third amplifier 48 at the output of the second amplifier 46 compensates frequency non-linearities of the high-power amplifier 38.

The example of the intermediate amplification subsystem 36 shown in FIG. 2 is provided by way of nonlimiting illustration. In particular, other amplifiers arranged in cascade may be included. For example, the automatic gain control loop 44 or AGC loop 44 may be optional. The automatic gain control loop 44 may also be disengageable and, when disengaged, allow operation of the transponder in a linear mode with commanded and fixed gain when operation of the transponder 20 is activated in a non-linear mode.

It should be noted that when the characterization of the performance of the payload is limited to the performance linked to the uplink, such as for example the radiation angular diagram of the receive satellite antenna, the payload G/T, the linear gain in an input portion of the transmission subsystem of the transponder, or is limited to the performance of the whole of the transponder when it operates in a linear mode, commands appropriate for a lower portion of the range of gains of the second amplification means 36 that can be telecommanded will be used.

It should be noted that if there are available a first measurement sensor of the input power of the transponder and a second sensor situated downstream of the low-noise amplifier, for example a sensor of the input power of the automatic gain control loop situated at the input of the AGC loop, maintaining the activity of the AGC loop does not prevent linear gain measurements and retransmission to the ground of the telemetry measurements of the first and second sensors will make it possible to carry out these linear gain measurements.

It should be noted that when such telemetry measurements are available, the characterization of performance linked to the uplink of the payload concerns interchangeably a transparent transponder or a regenerative transponder. It must be remembered that a regenerative transponder can be broken down into an uplink transmission subsystem including digital demodulation of received uplink signals and a downlink transmission subsystem including digital modulation of the signals sent on the downlink.

It should be noted that when characterization of the uplink or of the linear gain of a transponder of a transparent payload is performed with the aid of measurements carried out on the ground of a test thermal noise retransmitted by the payload, the configuration of the transponder is that suitable for a linear operating mode, which requires deactivation of the AGC loops in the transponder, if any.

When characterization of the payload as a whole is required, such as for example the evolution of the EIRP as a function of the input power of the transponder and/or the determination of the saturating flux density SFD, the AGC loop will be deactivated, and if there is available a sufficient dynamic range for the test thermal noise received at the input of the transponder relative to the noise floor of the transponder on its own, i.e. the inherent noise generated by the transponder and the natural thermal noise of the Earth, the EIRP can be measured in linear mode. The dynamic range is deemed to be sufficient for some types of measurement when it is greater than or equal to 10 dB. This has the consequence of having available on the ground a thermal noise generator capable of emitting sufficient power to reach the maximum value of the dynamic range compatible with the connection balance of the uplink between the IOT ground station and the payload of the satellite under test.

The measurements of the EIRP in linear mode could be complemented by measurements of the EIRP in non-linear mode by setting the test thermal noise level to its maximum level and progressively increasing the gain of the second amplification means.

The payload of the satellite is configured by a satellite control centre remote from the test station.

According to FIG. 1, a coverage area, which can be tested without using to telemetry measurements from the satellite, representing the test thermal noise power retransmitted by the payload 4 to be characterized, is limited to an area 62 of intersection between a first uplink coverage area 64 or coverage area of the receive satellite antenna 12 and a second downlink coverage area 66 or coverage area of the transmit satellite antenna 14.

When no such intersection area exists, it is necessary to use telemetry measurements from the satellite representing in a linear manner the test thermal noise power received in the receive band at the input of the transponder of the payload to be characterized for the characterization of the receive antenna 12.

Figure 3:
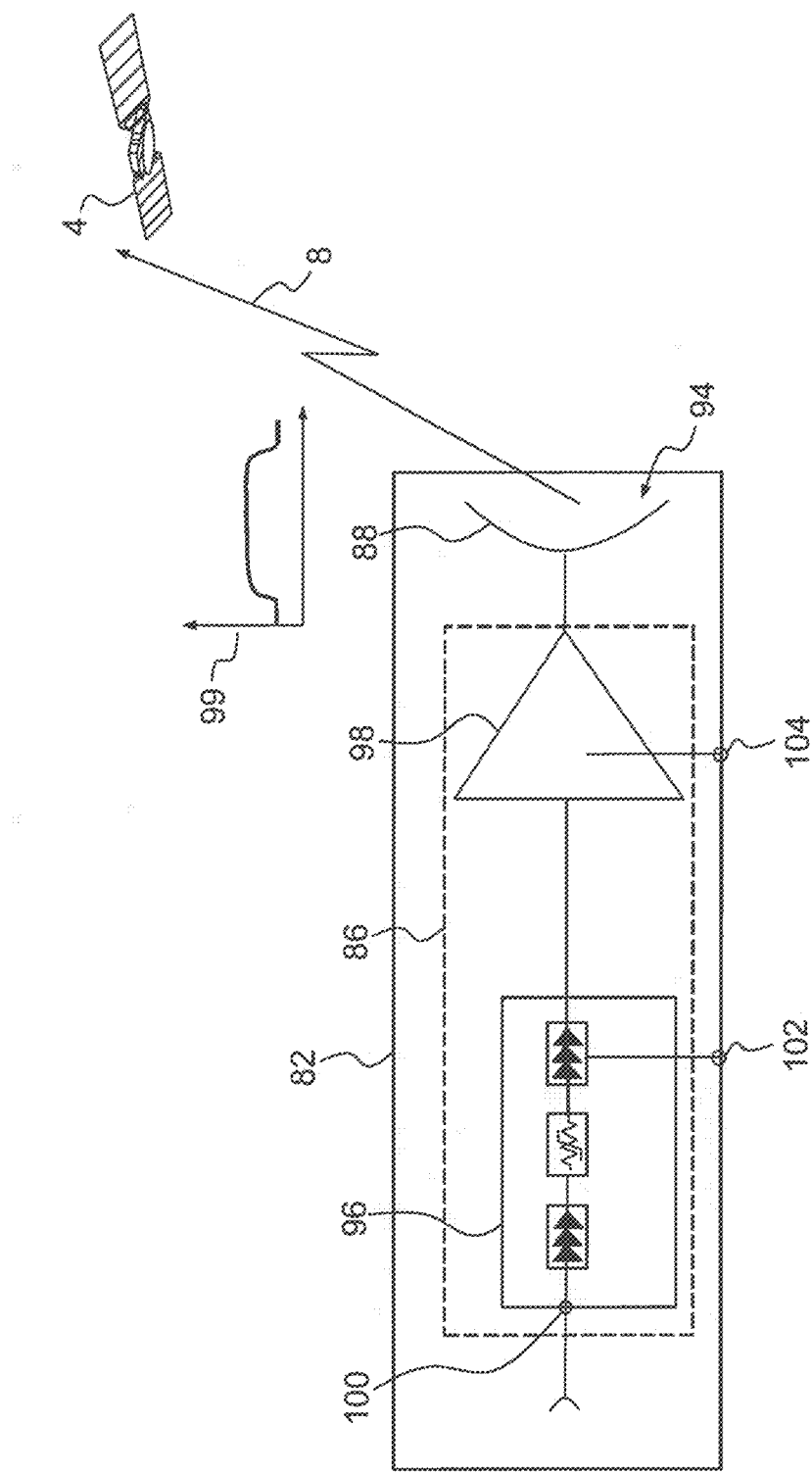
FIG. 3 is a view of a simplified example of the test ground system of the IOT system from FIG. 1.

According to FIGS. 1 and 3, the IOT system 2 comprises an IOT ground station 82 and an IOT bench 84.

The test ground station 82 is configured to generate a test signal consisting of a wide-band thermal noise signal amplified over the band of use of the uplink 8 of the payload 4 of the satellite 6 under test and the power spectral density of which is represented on a first spectrogram 85.

The test ground station 82 includes first radio-frequency amplification means 86 and a radio-frequency transmit ground antenna 88 with an input port 90 of the antenna 88 connected to an output port 92 of the first amplification means 86.

The test ground station 82 also includes a receive ground antenna 94 that here shares the same reflector of the transmit ground antenna 88 (assumed to be of the dual grid type) to receive the test thermal noise retransmitted by the payload 4 on the downlink 16 and the power spectral density of which is represented on a second spectrogram 93.

Alternatively, the transmit and receive ground antennas have separate reflectors.

Alternatively, the ground station does not use a receive ground antenna when there is no area of intersection between the first uplink coverage area and the second downlink coverage area.

The first amplification means 86 of the test ground station 82 can be configured to generate at the input of the transmit ground antenna 88 a test thermal noise having a bandwidth at least equal to the receive band of the transponder 20 and the power spectral density, i.e. the power density per unit frequency, can be adjusted to a test thermal noise power spectral density Dref such that, for said value Dref, the ratio of the test thermal noise density received from the test ground station and at the input 24 of the transponder 20 to the thermal noise floor density generated internally by the satellite 4 alone and the natural thermal noise of the Earth at the input 24 of the transponder 20 is greater than or equal to a first threshold Ds1 equal to 10 dB.

In practical terms, the test thermal noise power spectral density Dref is limited so that the ratio of the test thermal noise power spectral density received from the test ground station and at the input 24 of the transponder 20 to the thermal noise floor density generated internally by the satellite 4 alone and by the natural thermal noise of the Earth at the input of the receiver is less than or equal to a second threshold Ds2 equal to 40 dB.

According to FIG. 3 and a simplified embodiment the first amplification means 86 of the test ground station 82 include in cascade an intermediate amplifier subsystem 96 followed by a high-power amplifier 98 connected to the transmit ground antenna to transmit on the uplink 8 a wide-band test thermal noise the power spectrum of which is represented on a spectrogram 99.

The intermediate amplifier subsystem 96 is fed at an input port 100 with a source wide-band test thermal noise.

The test thermal noise is generated internally at the source by the inherent noise of the dissipative components of the first amplification means 86 or by an external noise generator not represented in FIG. 3.

The intermediate amplifier subsystem 96 and the high-power amplifier 98 respectively include a first gain control port 102 and a second gain control port 104 grouped together to be connected to the test bench.

According to FIG. 1, the test bench 84 includes a first interface port 122 controlling the first amplification means connected to the grouped first gain control ports 102 and 104 of the first amplification means and a second interface port 124 for direct measurement of the test thermal noise retransmitted by the payload 4 connected to the receive ground antenna 94.

The test bench 84 also includes a third interface port 126 connected to a telecommand and telemetry measurement infrastructure 136 of the payload 4 and the satellite platform, for example formed by a telecommand and telemetry measurement control and coordination unit 138 and terminating at a telecommand and telemetry measurement access station 140 that is visible from the satellite 6.

The test bench 84 is configured to perform in orbit tests (IOT) to characterize the performance of the payload 4 in accordance with the invention, coordinating the sending of commands to the satellite under test and to the test ground station 82, and to receive noise signals to be measured on the ground and/or telemetry measurements from the satellite 4.

The test bench 84 comprises means 152 for acquiring the received thermal noise power, payload and/or satellite platform telecommand means 154, storage means 156, and correlation means 158.

The acquisition means 152 are configured to acquire during a predetermined time period the test thermal noise retransmitted by the transmit satellite antenna 14 on the downlink 16 and received by the test ground station 82 when there exists an area 62 of intersection of the coverage areas 64, 66 of the receive antenna 12 and of the transmit antenna 14 of the satellite 6 and the ground station 82 is in said intersection area 62, and/or telemetry measurements of the test thermal noise received at various locations in the transponder 20, and telemetry measurements from the platform representing the RF power withstanding of the payload and/or the electrical consumption and/or the thermal performance of the platform when the payload is loaded with a test thermal noise in a configuration close to the operational conditions, for example that of maximum traffic or of traffic variable in time.

The spectral analysis of the signal is effected by a spectrum analyzer, for example, configured to effect low-pass filtering of the received signal in order to smooth the level of the signal by eliminating its high-frequency components. A plurality of successive measurement points are used during a temporal sweep.

The telecommand means 154 are configured to telecommand the payload 4 and/or the platform of the satellite 6 under test in service orbit during said predetermined time period to impart a depointing angular offset a of the receive satellite antenna relative to a reference pointing direction 160 of predetermined variation and/or to vary a linear gain of the transponder when it is in a linear amplification mode or to command a non-linear amplification mode of the transponder by activating an automatic gain control loop at the input of an output high-power amplifier.

The angular skew or offset imparted to the receive antenna of the satellite relative to the reference pointing direction 160 enables the characterization of the receive antenna in its coverage area and observation of the variations of gain or of directivity of the antenna as a function of time and consequently of the angle of view of the antenna. The depointing of the satellite is commanded from the telecommand and telemetry measurement access station 140, remote from and distant from the IOT ground station 82, via a telecommand link 162.

The telecommand means 154 are also configured to command the gain of the first amplification means 86 and thereby to adjust the power spectral density of the wide-band test thermal noise transmitted.

The storage means 156 are configured to store variations commanded by the command means of the test bench 84.

The correlation means 158 are configured to correlate the measurement of the signal via the transmit satellite antenna on the downlink 16 of the satellite when there exists an area 62 of intersection of the coverage areas of the receive antenna and the transmit antenna of the satellite and the test ground station 82 is located in the said intersection area, and/or telemetry measurements of the test signal received at various locations in the transponder 20 and/or other satellite parameters relating to the payload 4, representing the RF power withstanding of the payload, and performance in terms of consumption and thermal regulation of the platform, and to deduce therefrom the measured parameter variations characterizing the payload 4 or the platform as a function of the variations commanded to the satellite 6.

Means for processing the signal acquired by the test ground station may be included in the test ground station or in the test bench to process the measurements representing the test thermal noise received at the input of the transponder and to produce a measurement of the radiation diagram of the receive antenna 12 of the satellite 6.

Accordingly, the thermal noise of the test ground station on its uplink 8 is used as a test signal in order to enable IOT measurements on a payload 4 in flight in its service orbit.

This use of a wide-band thermal noise simply enables simultaneous access to the whole of the frequency plan of the payload 4 the band occupied by which has a width that may be up to a few GHz.

This use of a wide-band test thermal noise further makes it possible to facilitate the implementation of the test benches when a plurality of transmission channels must be tested simultaneously in the frequency band of the same transponder or two different bands of two different transponders.

By reducing the spectral density of the test signal, this use of a wide-band test thermal noise also makes it possible to minimize the constraints of frequency coordination with other adjacent satellite systems in service.

Figure 4:
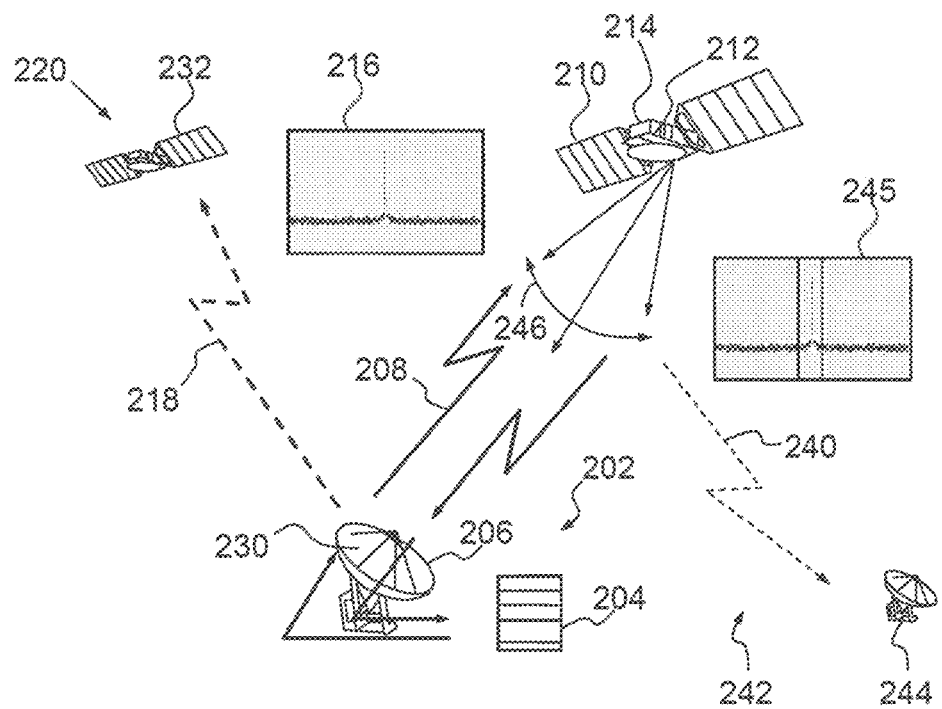
FIGS. 4 and 5 are comparative views of the degrees of interference to which adjacent satellite systems in service are subjected, caused by the satellite under test and the IOT system when the IOT signals are respectively one or more classic unmodulated signals or a wide-band thermal noise signal according to the invention.

According to FIG. 4, the possible interference channels created by a classic IOT system 202 are shown.

The classic IOT system 202 includes a test bench 204 and a test ground station 206 that are interconnected.

The test ground station 206 uses on an uplink 208 of a satellite 210 under test with a payload 212 that is to be characterized an unmodulated test signal, i.e. in practice a pure carrier, the power spectrum of which, received at the input 214 of a transponder, not shown, of the payload 212, is shown by a spectrogram 216.

A first possible interference channel 218 with a first adjacent satellite system 220 is an uplink on which a portion of the IOT signal is transmitted from the test ground station 206 via a secondary lobe of the transmit ground antenna 230 of the ground station 206 to an adjacent satellite 232 of the adjacent satellite system 220.

A second possible interference channel 240 on a second adjacent satellite system 242 that may be identical to the first adjacent satellite system 220 is a downlink on which a portion of the IOT signal retransmitted by the payload 212 when it is transparent is received by one or more user terminals 244 via their receive antennas. The power spectrum of the portion of the IOT signal retransmitted by the payload on the second channel 240 is illustrated by a spectrogram 245. This second interference channel 240 may have an important jamming effect for depointings 246 imparted to the transmission satellite antenna during testing of radiation angular sections or patterns of the receive satellite antenna that is to be characterized.

Figure 5:
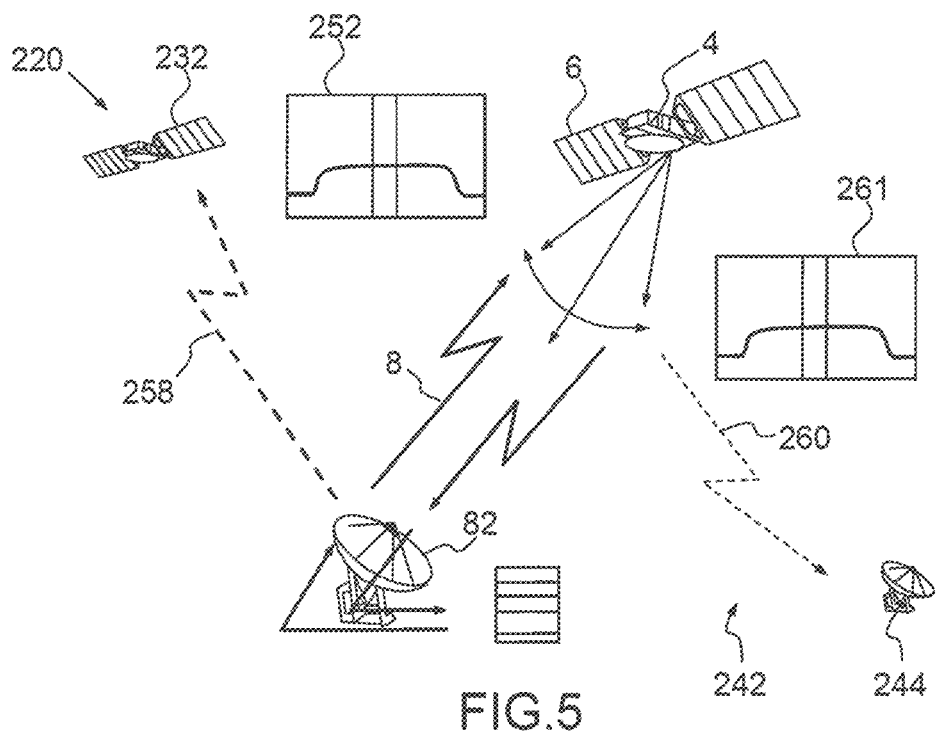

According to FIG. 5, the possible interference channels created by an IOT system 2 according to the invention like that shown in FIG. 1 are shown.

Conversely to the conventional IOT system, the test ground station 82 uses on the uplink 8 of the satellite 6 under test the payload 4 of which is to be characterized a test signal in the form of a wide-band thermal noise, the power spectrum of the test signal received at the input of the payload 4 is illustrated by a spectrogram 252.

As in the conventional IOT system from FIG. 4, the configurations of possible interference channels in terms of geometry, i.e. the positions of the stations, the terminals, and satellites, and in terms of the patterns of the antennas are identical for the IOT system 2 of the invention.

A first possible interference channel 258 with the first adjacent satellite system 220 is an uplink on which a portion of the IOT signal is transmitted from the test ground station 82 via a secondary lobe of the transmit ground antenna 88 of the ground station 82 to the adjacent satellite 232 of the adjacent satellite system 220.

A second possible interference channel 260 with the second adjacent satellite system 242 that may be identical to the first adjacent satellite system 220 is a downlink on which a portion of the IOT signal retransmitted by the transparent payload 4 is received by one or more user terminals 244 via their receive antennas. The power spectrum of the portion of the IOT signal retransmitted by the payload on the second channel 260 is illustrated by a spectrogram 261.

In the opposite way to the classic IOT system, the levels of interference created by the IOT system of the invention on the uplink and the downlink are significantly lower and are equal to: $P_{CW}-10*\log(B_{WN})$, in which $P_{CW}$ expressed in dBm is the power of the unmodulated equivalent test signal and $B_{WN}$ is the test noise band.

Figure 6:
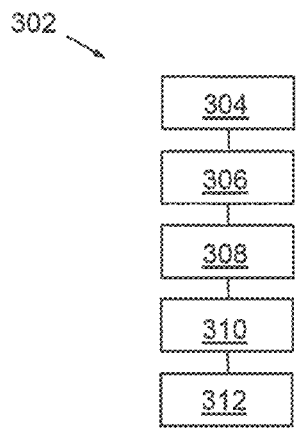
FIG. 6 is a general flowchart of a method in accordance with the invention of characterizing a payload, the payload being for example that from FIG. 2.

According to FIG. 6, a method of characterizing the performance of a payload of a satellite 302 in orbit is executed by a test ground station and a test bench like those shown in FIGS. 1 and 3 for example.

Generally speaking, to execute the characterization method 302 the test ground station includes first radio-frequency amplification means and a radio-frequency transmit ground antenna with a first input port of the antenna connected to the output of the first radio-frequency amplification means.

As shown in FIG. 2, the payload under test of the satellite includes a first uplink receive satellite antenna, a second downlink transmit satellite antenna, and a transponder connected between the first receive satellite antenna and the second transmit satellite antenna.

The transponder includes a second radio-frequency input port connected to an output port of the receive satellite antenna and second amplification means configured to amplify in an input portion of the transponder or the whole of the transponder signals in the frequency band of the transponder according to a linear amplification mode and with a fixed gain that can be telecommanded included within a range of gain varying between a first lower gain Gmin and a second higher gain Gmax inclusive.

Generally speaking, the method of characterizing the payload 302 includes a first supply step 304 consisting in supplying the first configurable amplification means to generate at the input of the transmit ground antenna a test thermal noise having a bandwidth at least equal to the band of the transponder and the power spectral density of which is adjustable up to a test thermal noise reference power spectral density Dref such that the ratio of the test thermal noise density received from the test ground station when the test thermal noise spectral density that it transmits is equal to the reference spectral density Dref and received at the input of the transponder to the thermal noise floor spectral density generated internally by the satellite alone and by the natural thermal noise of the Earth at the input of the receiver is greater than or equal to a first threshold Ds1 equal to 10 dB.

The first density threshold Ds1 of the test thermal noise depends on the receive band of the payload, the orbit of the satellite, the size of the transmit antenna of the test ground station and the G/T parameter of the payload of the satellite.

Link budgets are set out hereinafter by way of illustration in the form of three tables 1, 2, 3 which show that a first threshold value Ds1 equal to 10 dB is suitable for covering a wide range of tested satellite payloads in terms of satellite service orbit and payload receive bands.

Table 1 shows three typical link budgets for bands C, Ku and Ka when the satellite is in geostationary earth orbit (GEO).

Table 2 shows three typical link budgets for bands C, Ku and Ka when the satellite is in a medium earth orbit (MEO).

Table 3 shows three typical link budgets for bands C, Ku and Ka when the satellite is in low earth orbit (LEO).

According to tables 1 to 3, the power spectral density of the test thermal noise, corresponding to a first threshold Ds1 of 10 dB and generated at the input of the transmit antenna of the test ground station, is between −82 dBm/Hz and −60 dBm/Hz inclusive in band Ka, between −68 dBm/Hz and −46 dBm/Hz inclusive in band Ku, and between −67 dBm/Hz and −44 dBm/Hz inclusive in band C.

The transmit frequency band of the ground station, respectively the receive band of the payload, is in bands L, S, C, X, Q, V, Ku and Ka.

The bandwidth of the test thermal noise transmitted to the satellite is between 250 MHz and 3 GHz inclusive or between 3% and 10% inclusive of a central frequency of the transmit frequency band of the station or receive frequency band of the satellite.

TABLE 1

| | | GEO (36000 km) | | |
|---|---|---|---|---|
| | | Ka | Ku | C |
| G/S output noise power | dBm | 35 | 49 | 51 |
| G/S output noise density | dBm/Hz | −60 | −46 | −44 |
| Noise power/4 kHz | dBm/4 kHz | −24 | −10 | −8 |
| G/S transmit antenna diameter | M | 9 | 9 | 11 |
| G/S transmit antenna gain | dBi | 67 | 61 | 55 |
| G/S noise EIRP density per 4 kHz | dBW/Hz | 14 | 21 | 17 |
| G/S noise EIRP density per Hz | dBW/Hz | −22 | −15 | −19 |
| G/S noise EIRP density per GHz | dBW/1 GHz | 68 | 75 | 71 |
| Sat-G/S distance | Km | 36000 | 36000 | 36000 |
| Spatial diffusion propagation losses | dB | 162 | 162 | 162 |
| G/S noise power flux density | dBW/Hz/m² | −185 | −177 | −181 |
| Band frequency | MHz | 30000 | 14000 | 6000 |
| Isotropic | dBm² | −51 | −44 | −37 |
| Satellite receive antenna typical gain | dBi | 45 | 30 | 25 |
| Satellite payload G/T | dB/K | 18 | 3 | −2 |
| Ground station noise density received at input of transponder | dBm/Hz | −160 | −161 | −162 |
| Payload noise density | dBm/Hz | −171 | −172 | −173 |
| Total noise density | dBm/Hz | −161 | −162 | −163 |
| Received ground station noise/payload inherent noise difference | dB | 10 | 10 | 10 |

TABLE 2

| | | MEO (8000 km) | | |
|---|---|---|---|---|
| | | Ka | Ku | C |
| G/S output noise power | dBm | 29 | 43 | 45 |
| G/S output noise density | dBm/Hz | −66 | −52 | −50 |
| Noise power/4 kHz | dBm/4 kHz | −30 | −16 | −14 |
| G/S transmit antenna diameter | M | 7 | 7 | 9 |
| G/S transmit antenna gain | dBi | 65 | 58 | 53 |
| G/S noise EIRP density per 4 kHz | dBW/Hz | 5 | 13 | 10 |
| G/S noise EIRP density per Hz | dBW/Hz | −31 | −23 | −26 |
| G/S noise EIRP density per GHz | dBW/1 GHz | 59 | 67 | 64 |
| Sat-G/S distance | Km | 8000 | 8000 | 8000 |
| Spatial diffusion propagation losses | dB | 149 | 149 | 149 |
| G/S noise power flux density | dBW/Hz/m² | −180 | −172 | −176 |
| Band frequency | MHz | 30000 | 14000 | 6000 |
| Isotropic | dBm² | −51 | −44 | −37 |
| Satellite receive antenna typical gain | dBi | 40 | 25 | 20 |
| Satellite payload G/T | dB/K | 13 | −2 | −7 |
| Ground station noise density received at input of transponder | dBm/Hz | −161 | −162 | −163 |
| Payload noise density | dBm/Hz | −171 | −172 | −173 |
| Total noise density | dBm/Hz | −160 | −161 | −162 |
| Received ground station noise/payload inherent noise difference | dB | 10 | 10 | 10 |

TABLE 3

| | | LEO (1200 km) | | |
|---|---|---|---|---|
| | | Ka | Ku | C |
| G/S output noise power | dBm | 12.5 | 26.5 | 28 |
| G/S output noise density | dBm/Hz | −82 | −68 | −67 |
| Noise power/4 kHz | dBm/4 kHz | −46 | −32 | −31 |
| G/S transmit antenna diameter | M | 7 | 7 | 9 |
| G/S transmit antenna gain | dBi | 65 | 58 | 53 |
| G/S noise EIRP density per 4 kHz | dBW/Hz | −11 | −4 | −7 |
| G/S noise EIRP density per Hz | dBW/Hz | −47 | −40 | −43 |
| G/S noise EIRP density per GHz | dBW/1 GHz | 43 | 50 | 47 |
| Sat-G/S distance | Km | 1200 | 1200 | 1200 |
| Spatial diffusion propagation losses | dB | 133 | 133 | 133 |
| G/S noise power flux density | dBW/Hz/m² | −180 | −172 | −176 |
| Band frequency | MHz | 30000 | 14000 | 6000 |
| Isotropic | dBm² | −51 | −44 | −37 |
| Satellite receive antenna typical gain | dBi | 40 | 25 | 20 |
| Satellite payload G/T | dB/K | 13 | −2 | −7 |
| Ground station noise density received at input of transponder | dBm/Hz | −161 | −162 | −163 |
| Payload noise density | dBm/Hz | −171 | −172 | −173 |
| Total noise density | dBm/Hz | −160 | −161 | −163 |
| Received ground station noise/payload inherent noise difference | dB | 10 | 10 | 10 |

In a supplementary way, the test thermal noise reference spectral density Dref is such that the ratio of the density of the test thermal noise received from the test ground station when the thermal noise density that it transmits is equal to the reference spectral density Dref and received at the input of the receiver to the thermal noise floor density generated by the satellite alone internally and the natural thermal noise of the Earth at the input of the receiver is less than or equal to a second threshold Ds2 equal to 40 dB.

Generally speaking, the test ground station has an interface port for respectively sending configuration telecommands to and receiving telemetry measurements from the satellite via a telecommand and telemetry measurement infrastructure ending at a satellite and payload telecommand and telemetry measurement station visible from the satellite.

In this general case, the characterization method 302 comprises the following supplementary steps.

In a second step 306, the attitude of the satellite and/or of the receive satellite antenna is configured by telecommand so that the receive satellite antenna points to the ground station according to a reference pointing angular position.

Then, in a third step 308 the second amplification means 28 of the payload are configured by telecommand to a predetermined fixed gain that corresponds to a linear mode of operation in at least the input portion of the transponder or in the whole of the transponder when the test thermal noise received from the ground station and at the input of the transponder corresponds to a test thermal noise spectral density transmitted by the ground station equal to the reference density Dref.

Then, in a fourth step 310, the first amplification means 86 of the test ground station 82 are configured by a command from the test bench 84 to generate at the input of the transmit ground antenna 82 a test thermal noise having a bandwidth at least equal to the receive band of the transponder 20 and the power spectral density of which is equal to the reference spectral density Dref and to cause the transmission of the test thermal noise by the ground station 82 in this configuration of the first amplification means 36.

Then, in a fifth step 312, during a predetermined time period at least one measurement representing the power received at the input of the transponder is acquired via at least one corresponding receive power measurement. The at least one measurement is acquired either by the test ground station 82 via the downlink 16 when there exists an area 62 of intersection of the coverage areas of the receive antenna and of the transmit antenna of the satellite and the test ground station 82 is in said intersection area 62 or via corresponding telemetry measurements of the received power at a location of the transponder where the amplification is linear.

Specifically, the characterization of the performance of the payload of the satellite in orbit executed by the general characterization method 302 is included in the set comprising:

the characterization of the angular diagram and/or angular sections of radiation of the receive antenna of the satellite when the payload transponder is a transparent transponder or a regenerative transponder;

the linear gain response in the band of the transponder from the input port to the output port of the transponder when the transponder is a transparent transponder operating in a linear mode and when there exists an area of intersection of the coverage areas of the receive antenna and of the transmit antenna of the satellite and the ground station is in the latter;

the variation of the linear gain of the transponder as a function of frequency in the band of the transponder for a fixed gain of the transponder;

the measurement of the saturating flux or of the saturating flux density (SFD) of the transponder of the satellite and the measurement of the EIRP (effective isotropic radiated power) of the payload when the transponder is transparent;

the measurement of the G/T of the payload with or without visibility of the downlink from the ground station when the transponder is a transparent transponder or a regenerative transponder;

the characterization of the RF power withstanding of the payload and/or the consumption and/or the performance of the platform when the payload is loaded by the test thermal noise received in a configuration close to the operational conditions, for example according to a maximum traffic or a traffic variable in time.

Figure 7:
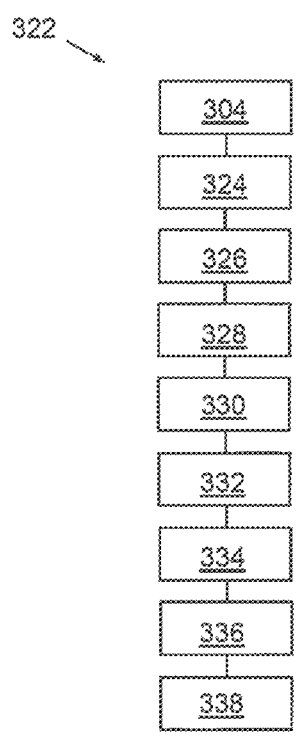
FIG. 7 is a flowchart of the characterization of one or more radiation diagrams and/or a plurality of radiation angular sections of the receive satellite antenna of the payload.

According to FIG. 7 and a particular second embodiment of the invention, the characterization of the payload concerns the characterization of an angular diagram or of angular sections of variation of the directivity of the receive satellite antenna 12. A method 322 of characterizing this performance comprises the first step 304 and a set of steps 324, 326, 328, 330, 332, 334, 336, 338.

In the step 324, the attitude of the satellite and/or of the receive satellite antenna (in the case of an antenna mobile relative to the platform the attitude of which relative to the latter can be controlled) is configured by telecommand so that the receive satellite antenna points toward the test ground station 82 according to a reference pointing angular position.

In the step 326, the second amplification means 28 of the payload are configured by telecommand at a predetermined first fixed gain that corresponds to a linear mode of operation in an input portion of the transponder corresponding to the uplink (in the case of a transparent transponder and a regenerative transponder) or in the whole of the transponder (in the case of a transparent transponder with AGC loop absent or deactivated) when the test thermal noise received from the ground station and at the input of the transponder corresponds to a test thermal noise spectral density transmitted by the ground station 82 equal to the reference spectral density Dref.

Then, in the step 328 the first amplification means 86 of the ground station 82 are commanded by the test bench 84 to generate at the input of the transmit ground antenna a test thermal noise having a bandwidth greater than or equal to the receive band of the transponder and the spectral density of which is equal to the reference spectral density Dref.

Then, in the step 330 the ground station 82 generates during a predetermined time period the test thermal noise corresponding to the configuration of the first amplification means 86 at the reference spectral density Dref when the receive satellite antenna 12 is pointing at the ground station 82 according to the reference pointing direction.

Then, in the step 332 a reference level corresponding to the reference pointing direction is measured on the basis of the test thermal noise signal transmitted by the payload 4 on the downlink 16 and received by the ground station 82 via a receive ground antenna when there exists an area 62 of intersection of the coverage areas of the receive antenna and of the transmit antenna of the satellite and the ground station 82 is in the sad intersection area, or from a telemetry measurement from the satellite supplying the received power level at a location of the transponder where the amplification is linear and where incidentally the gain up to that location is known.

Then, in the step 334, the receive antenna is depointed relative to the reference pointing direction over a set of depointing angular positions of the receive antenna.

In the same step 334, for each depointing angular position, the test thermal noise covering the receive band of the transponder and corresponding to the configuration of the first amplification means 86 at the reference spectral density Dref is generated on the ground during a predetermined time interval, and during a predetermined time interval, on one or more frequencies in the band of the transponder, the relative directivity or the relative gain of the receive satellite antenna 12 relative to the reference level is measured, corresponding to the depointing angular position of the receive satellite antenna. The relative directivity or the relative gain of the receive satellite antenna relative to the reference directivity or the reference gain are measured in the test thermal noise signal transmitted by the payload 4 on the downlink 16 and received by the ground station via a receive ground antenna when there exists an area 62 of intersection of the coverage areas of the receive antenna and of the transmit antenna of the satellite and the ground station 82 is in the said intersection area or from a telemetry measurement from the satellite supplying the received power level at a location of the transponder where the amplification is linear and where incidentally the gain up to that location is known.

In parallel with the execution of the step 334 and in a step 336 the commanded depointing angular offsets of the receive satellite antenna 12 and the associated measurements of relative directivity or of relative gain are stored.

Then, in the step 338 one or more variation angular diagrams of the directivity of the receive satellite antenna 12 and/or one or more variation angular sections of the directivity of the receive satellite antenna 12 are reconstituted from the commanded depointing angular offsets of the receive satellite antenna 12 and the associated single-frequency or multi-frequency measurements of relative directivity or relative gain.

Figure 8:
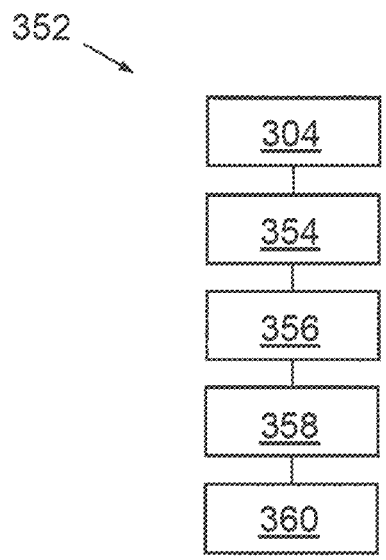
FIG. 8 is a flowchart of the characterization of the gain response of the transponder from its input end to its output end over the whole of the receive band of the transponder according to a predetermined gain command applied to the second amplification means in a linear mode of operation of the transponder.

According to FIG. 8, and a third embodiment, the transponder is assumed transparent and the characterization of the payload concerns the characterization of the gain response of the transponder 20 from its input end to its output end according to a predetermined gain command of the second amplification means 28 for which the transponder 20 operates in linear mode when the ground station 82 generates a test thermal noise the power spectral density of which is equal to the reference power spectral density Dref. A method 352 of characterizing this performance comprises the first step 304 by way of a preliminary step and a set of steps 354, 356, 358 and 360.

In the step 354, the receive satellite antenna 12 is pointed by telecommand at the test ground station 82 according to a reference pointing direction.

Then, in the step 356 the second amplification means 28 are configured by telecommand to fix the gain of the transponder at the predetermined gain value compatible with linear operation of the transponder when the ground station 82 transmits the test thermal noise at the reference power spectral density Dref.

Then, in the step 358 the first amplification means 86 of the ground station are commanded by the test bench 84 to generate a test thermal noise at the input of the transmit ground antenna 88 covering the band of the transponder and to cause the power spectral density of the test thermal noise to vary in steps of predetermined duration in a range of attenuation relative to the reference spectral density Dref between 0 dB and a backoff value less than or equal to the first threshold Ds1 inclusive.

In parallel with this, in the step 360, over the swept set of power spectral densities of the thermal noise generated by the ground station 82, the powers at the input of the transponder 20 and the corresponding powers at the output of the transponder are measured in a correlated way based on measurements made at the level of the ground station on the uplink and the downlink, and the evolution of the gain as a function of the input power of the transponder is deduced from these measurements.

Figure 9:
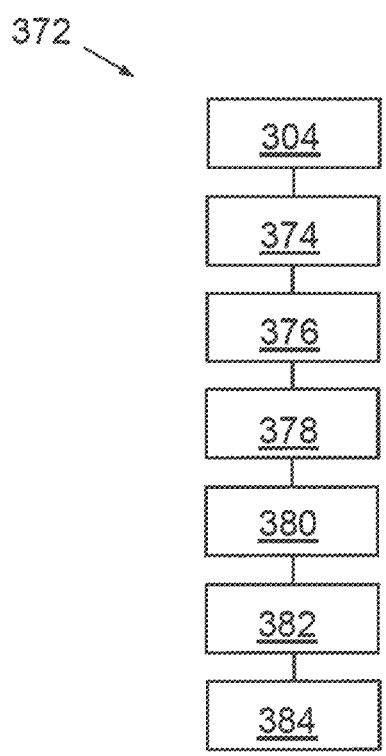
FIG. 9 is a flowchart of the characterization of the frequency response of the gain over the entire band of the transponder according to the same predetermined gain command applied to the second amplification means for which the transponder operates in linear mode.

According to FIG. 9, and a fourth embodiment, the transponder is assumed to be transparent and the characterization of the payload concerns the characterization of the frequency response of the gain over the entire band of the transponder according to the same predetermined gain command applied to the second amplification means 28 for which the transponder operates in linear mode when the ground station 82 generates a test thermal noise the power spectral density of which is equal to the reference power density Dref.

A method 372 of characterizing this performance comprises the first step 304 by way of a preliminary step and a set of steps 374, 376, 378, 380, 382 and 384.

In the step 374, the receive satellite antenna 12 is pointed at the test ground station 82 according to a reference pointing direction.

Then, in the step 376, the second amplification means 28 are configured by telecommand to fix the gain of the transponder at a predetermined gain value compatible with linear operation of the transponder when the ground station 82 transmits the test thermal noise at the reference power spectral density.

Then, in the step 378 the first amplification means 86 of the ground station 82 are commanded by the test bench 84 to generate a thermal noise at the input of the transmit ground antenna 88 covering the receive band of the transponder at the reference power spectral density Dref.

In parallel with the step 378 and in a correlated manner, in the step 380 the spectral densities transmitted and received via the receive ground antenna 94 by the ground station 82 when there exists an area 62 of intersection of the coverage areas of the receive antenna and of the transmit antenna of the satellite and the ground station 82 is in the said intersection area are measured over a set of frequencies swept in steps of predetermined duration.

In the step 382, the swept frequencies and the corresponding receive power spectral densities are stored.

Then, in the step 384 the gain variation as a function of frequency in the receive band of the transponder is deduced from these measurements.

Figure 10:
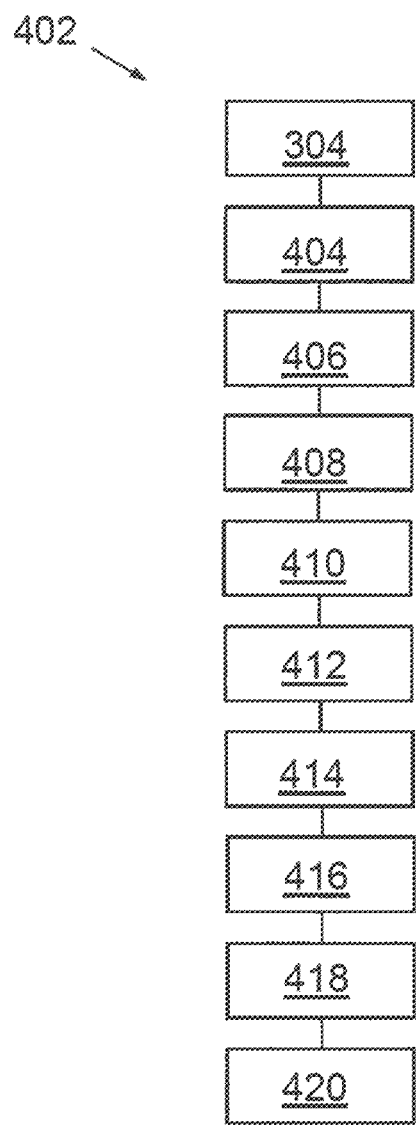
FIG. 10 is a flowchart of the characterization of the saturating flux or of the saturating flux density (SFD) of the transponder of the satellite and/or of the measurement of the EIRP (effective isotropic radiated power) of the payload.

According to FIG. 10 and a fifth embodiment, the transponder 20 is assumed transparent and the characterization of the payload concerns the characterization of the saturating flux or the saturating flux density (SFD) of the transponder of the satellite and/or the measurement of the EIRP (effective isotropic radiated power) of the payload. A method 402 of characterizing this performance comprises the first step 304 by way of a preliminary step and a set of steps 404, 406, 408, 410, 412, 414, 416, 418 and 420.

In the first series of steps 404, 406, 408, 410, 412, the saturating flux or the saturating flux density (SFD) of the transponder of the satellite is characterized.

In the step 404, the receive antenna of the satellite is pointed at the test ground station according to a reference pointing direction.

Then, in the step 406, the second amplification means 28 are configured by telecommand to cause the transponder to operate in a linear amplification mode when the power spectral density of the test thermal noise injected at the input of the transmit ground antenna 88 is less than or equal to the reference power spectral density Dref.

Then, in the step 408 the first amplification means 86 of the test ground station 82 are commanded by the test bench 84 to generate a test thermal noise at the input of the transmit ground antenna covering the receive band of the transponder and to cause the test thermal noise power spectral density to vary in steps of predetermined duration in a range of attenuation relative to the reference spectral density Dref between 0 dB and a backoff value less than or equal to the first threshold Ds1 inclusive.

In parallel with the step 408 and in the step 410, there are measured in a correlated manner over the set of swept power spectral densities of the thermal noise generated by the ground station 82:

either the corresponding input and output powers of the transponder via the satellite telemetry measurements, or the input powers of the transponder via measurement at the level of the ground station or via the satellite telemetry measurement and the corresponding powers received by the ground station via the receive ground antenna 94 when there exists an area 62 of intersection of the coverage areas of the receive antenna and of the transmit antenna of the satellite and the ground station is in said intersection area.

Then, in the step 412 the variation of the effective isotropic radiated power (EIRP) of the payload as a function of the input power received by the transponder over a first range of input power and of the fixed gain of the transponder is deduced from these measurements.

In the second series of steps 414, 416, 418, 420, the effective isotropic radiated power (EIRP) is measured.

In the step 414 the first amplification means 86 are commanded by the test bench 84 to fix the thermal noise spectral density injected at the input of the transmit ground antenna 88 and covering the total band of the transponder at the reference power spectral density Dref.

Then, in the step 416 the second amplification means 28 of the transponder 20 are configured by causing to vary in steps of predetermined duration the linear gain of the transponder 10 in a range of gains of the transponder between the first lower gain value Gmin and the second higher gain value Gmax inclusive to cause the transponder 20 to operate in a non-linear mode in which a high-power amplifier forming one end of the second amplification means 28 is compressed.

In parallel with the step 416 and in a correlated manner in the step 418, there are measured over the swept set of linear gain commands of the transponder:

either the corresponding input and output powers of the transponder via satellite telemetry measurements, or the input powers of the transponder via measurement at the level of the ground station or via satellite telemetry measurement and the corresponding powers received by the ground station via the receive ground antenna when there exists an area of intersection of the coverage areas of the receive antenna and of the transmit antenna of the satellite and the ground station is in said intersection area.

Then in the step 420, the variations of the effective isotropic radiated power (EIRP) of the payload as a function of the input power received by the transponder over the first range of input power and/or the saturating flux density (SFD) are deduced from the measurements.

The set of steps 406, 408, 410, 412 characterizes linear operation of the transponder whereas the set of steps 414, 416, 418, 420 characterizes non-linear operation of the transponder.

Alternatively, only one of the two series of steps (either the first series or the second series) is effected.

Figure 11:
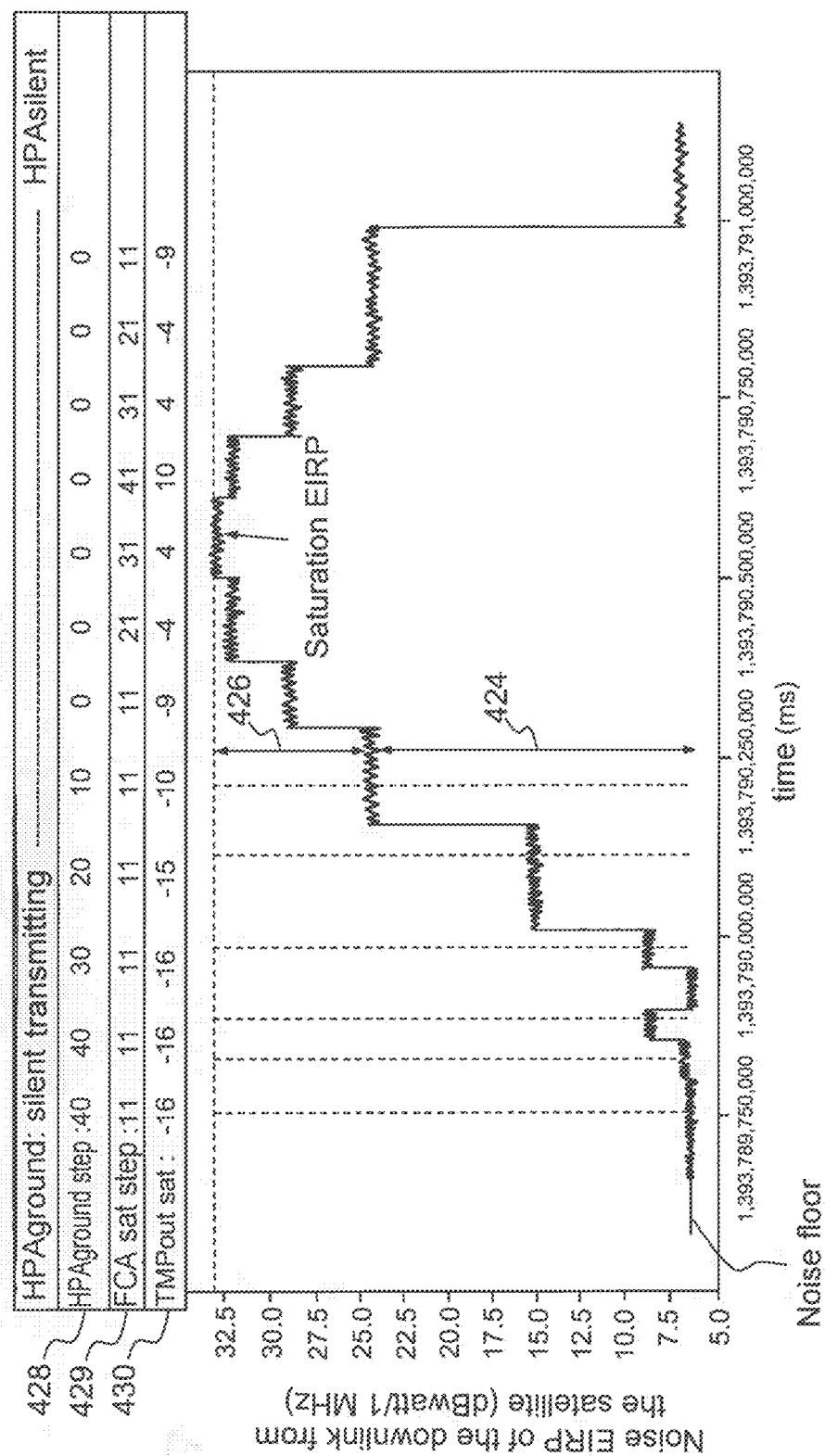
FIG. 11 is a view of one example of the evolution of the measured EIRP of a payload in band Ka when the gains of the IOT ground station and the transponder of the payload under test are caused to vary according to the method of characterizing the evolution of the EIRP shown in FIG. 10.

According to FIG. 11, results are shown of measurements obtained by executing the method 402 on a transparent payload in band Ka, and show a first range 424 of observation and a second range 426 of observation of the evolution with time of the EIRP of the payload when a test thermal noise is transmitted by the IOT test ground station and the respective gains of the first amplification means 86 and the second amplification means 28 are caused to vary.

The first observation range 424 corresponds to operation of the transponder that may be considered linear and to a dynamic range of adjustment of the first amplification means 86 equal here to 18 dB. Given the noise floor referred to the output of the transponder shown in FIG. 11, it may be deduced that Dref is equal to 18 dB, which value is higher than the first threshold Ds1 equal to 10 dB. As shown by a first strip 428 indicating the adjustment of the gain of the first amplification means expressed as an attenuation in dB of the maximum power transmitted by the high-power amplifier of the ground station 82, and a second strip 429 indicating the adjustment of the gain in dB of the second amplification means, the adjustments effected correspond to the steps 406, 408, 410, 412 of the method 402.

The second range 426 of observation corresponds to non-linear operation of the transponder for which the first amplification means 86 are adjusted to the maximum transmission of test noise power by the high-power amplifier of the ground station 82 and the gain of the second amplification means is progressively increased in steps of predetermined duration until a saturation EIRP is reached.

A third strip 430 indicates the backoff value, expressed in dBm, of the output power of the high-power amplifier of the transponder, referred to a telemetry measurement of the output power of the transponder.

As the indications in the first, second and third strips 428, 429, 430, show, the adjustments effected correspond to the steps 414, 416, 418, 420 of the method 402.

Figure 12:
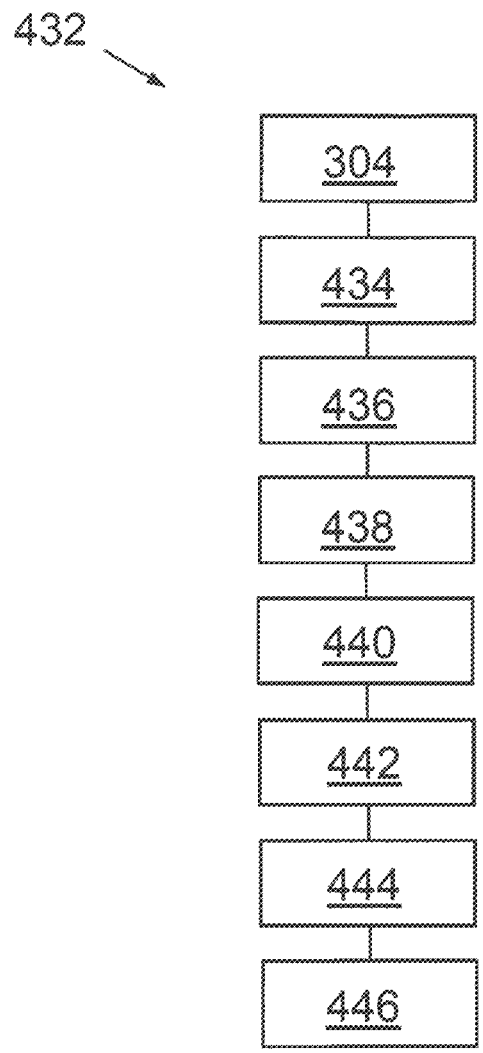
FIG. 12 is a flowchart of the characterization of the G/T of the payload.

According to FIG. 12, and a sixth embodiment, the transponder is assumed transparent or regenerative, and when the transponder is transparent it is also assumed that the intersection between the uplink coverage and the downlink coverage is empty.

The characterization of the payload concerns the measurement of the G/T of the payload, G designating the gain of the antenna in a predetermined direction and T designating the noise temperature referred to the input of the transponder.

A method 432 of measuring the G/T of the payload comprises the first step 304 by way of a preliminary step and a set of steps 434, 436, 438, 440, 442, 444 and 446.

In the step 434, the receive antenna 12 of the satellite is pointed by telecommand at the ground station 82 according to a reference pointing direction.

Then, in the step 436 the transmission of radio-electric signals by the test ground station 82 is switched off or left switched off.

Then, in the step 438 the second amplification means 28 of the transponder 20 are configured by telecommand to fix the gain of the transponder at a gain value compatible with linear operation of the transponder and measurement of noise via a telemetry measurement from the satellite.

Then in the step 440, a first thermal noise N1 inherent to the transponder and present at the input of the transponder is measured via input telemetry measurement of the transponder 20.

Then, in the step 442, the test ground station 82 is activated and the first amplification means 86 are commanded by the test bench to generate a test thermal noise the spectral density of which is equal to the reference spectral density Dref.

Then, in the step 444, the power of the thermal noise N2 received from the ground station 82 and at the input of the transponder is measured in the receive band of the transponder via transponder input telemetry measurement.

Then in the step 446, the ratio G/T is deduced from the ratio of the power of the received noise N2 to the thermal noise N1 inherent to the transponder.

Alternatively, when the transponder is transparent and there exists an area of intersection between the uplink coverage and the downlink coverage, a second method of measuring the G/T of the payload comprises the same steps 434, 436, 442, 446 as the first method 432 of measuring G/T.

The second method of measuring the G/T differs from the first method 432 of measuring the G/T in that the two steps 438, 440 are replaced by the steps consisting in configuring the second amplification means 28 of the transponder with a gain value compatible with linear operation of the transponder and then the ground station 82 measuring the inherent thermal noise N1 on the downlink, and in that the step 444 is replaced by the step consisting in the ground station 82 measuring a thermal noise N2 received on the downlink.

The invention claimed is:

1. A method of characterizing a performance of a payload of a satellite in orbit using a test ground station, comprising:
the test ground station including at least one first radio-frequency amplifier, and a radio-frequency transmit ground antenna with a first input port of the antenna connected to an output of the at least one first radio-frequency amplifier,
the payload of the satellite including a first receive satellite antenna for uplink, a second transmit satellite antenna for downlink, and a transponder connected between the first receive satellite antenna and the second transmit satellite antenna,
the transponder including a second radio-frequency input port connected to an output port of the receive satellite antenna, and at least one second amplifier being configured to amplify in an input portion of an uplink transponder or in the whole of transponder signals in a receive frequency band of the transponder, according to a linear amplification mode and with a fixed gain that can be remote-controlled and included in a gain range varying between a first lower gain Gmin and a second higher gain Gmax inclusive,
the method further comprises a supply step of:
generating a test thermal noise with the at least one first radio-frequency amplifier at the input of a transmit ground antenna, the test thermal noise having a bandwidth greater than or equal to the receive band of the transponder and a power spectral density of which is adjusted to a test thermal noise reference power spectral density Dref such that a ratio of the spectral density of the test thermal noise, received from the test ground station when the thermal noise spectral density that it transmits is equal to the reference spectral density Dref, and received at the input of the transponder, to a thermal noise floor spectral density generated by the satellite alone internally and natural thermal noise of the Earth at the input of the transponder is greater than or equal to a first threshold Ds1 equal to 10 dB.

2. The method according to claim 1 of characterizing performance of a payload,
in which a test bench remote from or integrated into the test ground station is configured to send and to receive, respectively, configuration telecommands and telemetry measurements from the satellite via a telecommand and telemetry measurement infrastructure, ending at a telecommand and telemetry measurement station visible from the satellite, and to send to and to receive from the test ground station commands of the at least one first amplifier and the test thermal noise retransmitted by the satellite with or without processing,
the method further comprising the steps:
configuring at least one of the attitude of the satellite and of the receive satellite antenna so that the receive antenna points toward the ground station according to a reference pointing angular position;
configuring the at least one second amplifier of the payload at a predetermined fixed gain that corresponds to a linear mode of operation over at least the input portion of the transponder corresponding to the uplink or to the whole of the transponder when the test thermal noise received from the ground station and at the input of the transponder corresponds to a test thermal noise spectral density transmitted by the ground station equal to the reference spectral density Dref;
configuring the at least one first amplifier of the test ground station to generate at the input of the transmit ground antenna a test thermal noise having a band covering the receive band of the transponder and the power spectral density of which is equal to the reference spectral density Dref, and to have the test thermal noise transmitted by the test ground station in this configuration of the at least one first amplifier; then
during a predetermined time period, acquiring at least one measurement representing the power received at the input of the transponder via at least one corresponding received power measurement:
either by the test ground station via the downlink when there exists an area of intersection of the coverage areas of the receive antenna and the transmit antenna of the satellite and the ground station is inside said intersection area;
or by corresponding telemetry measurements of the power picked up at a location of the transponder where the amplification is linear and where the corresponding gain is incidentally known.

3. The method according to claim 1 of characterizing the performance of a payload, wherein the bandwidth of the test thermal noise transmitted to the satellite is between 30 MHz and 3 GHz inclusive or between 3% and 10% inclusive of a central frequency of the transmit frequency band of the test ground station or the receive frequency band of the payload.

4. The method according to claim 1 of characterizing the performance of a payload, in which the transmit frequency band of the test ground station, respectively the receive band of the payload, is in bands L, S, C, X, Q, V, Ku and Ka,
wherein the frequency band L has a range of frequencies from 1 to 2 gigahertz (GHz),
wherein the frequency band S has a range of frequencies from 2 to 4 gigahertz (GHz),
wherein the frequency band C has a range of frequencies from 500 to 1000 MHz,
wherein the frequency band X has a range of frequencies from 7.0 to 11.2 GHz,
wherein the frequency band Q has a range of frequencies from 33 and 50 GHz,
wherein the frequency band V has a range of frequencies from 40 to 75 gigahertz (GHz),
wherein the frequency band Ku has a range of frequencies from 12 to 18 gigahertz (GHz), and
wherein the frequency band Ka has a range of frequencies from 26.5-40 gigahertz (GHz).

5. The method according to claim 1 for characterizing the performance of a payload, in which a first noise density ratio threshold Ds1 depends on the receive frequency band of the payload, the orbit of the satellite, the size of the transmit antenna of the test ground station and a G/T parameter of the payload of the satellite under test.

6. The method according to claim 1 for characterizing the performance of a payload, in which the characterization of the performance of the payload of the satellite in service orbit is included within the combination of:
the single-frequency or multi-frequency characterization of at least one or more radiation angular diagrams and of one or more radiation angular sections of the receive antenna of the satellite when the payload transponder is a transparent transponder or a regenerative transponder;

the linear gain response from the input port to the output port of the transponder when the transponder is a transparent transponder operating in a linear mode and when there exists an area of intersection of the coverage areas of the receive antenna and of the transmit antenna of the satellite and the ground station is in the said area of intersection;

the variation of the linear gain of the transponder as a function of frequency in the band of the transponder for a fixed gain of the transponder;

the measurement of a saturating flux or of a saturating flux density (SFD) of the transponder of the satellite and the measurement of the effective isotropic radiated power (EIRP) of the payload when the transponder is transparent;

the measurement of a G/T of the payload with or without visibility of the downlink from the ground station;

the characterization of the RF power withstanding at least one of the payload, the consumption, and the performance of the platform when the payload is loaded by the thermal noise received in a configuration close to the operational conditions, for example in accordance with a maximum traffic or a traffic variable in time.

7. The method according to claim 1 for characterizing the performance of a payload, in which:
the characterization of the payload is the characterization of an angular withstanding or of angular sections of variation of the directivity of the receive satellite antenna, and the method comprises the steps:
configuring the attitude of at least one of the satellite and of the receive satellite antenna so that the receive satellite antenna points toward the test ground station according to a reference pointing angular position;

configuring the at least one second amplifier of the payload at a predetermined first fixed gain that corresponds to a linear mode of operation in the input portion of the transponder corresponding to the uplink or in the whole of the transponder when the test thermal noise received from the ground station and at the input of the transponder corresponds to a test thermal noise spectral density transmitted by the ground station equal to the reference spectral density Dref;

configuring the at least one first amplifier of the ground station to generate at the input of the transmit ground antenna a test thermal noise having a bandwidth greater than or equal to that of the receive band of the transponder and the power spectral density of which is equal to the reference spectral density Dref;

the ground station then generating during a predetermined time period by the test thermal noise corresponding to the configuration of the at least one first amplifier at the reference spectral density Dref when the receive satellite antenna points to the ground station according to the reference pointing direction; then measuring a reference level corresponding to the reference pointing direction from the test thermal noise signal retransmitted by the payload on the downlink and received by the ground station via a receive ground antenna when there exists an area of intersection of the coverage areas of the receive antenna and of the transmit antenna of the satellite and the ground station is in the said intersection area, or from a telemetry measurement from the satellite supplying the power level received at a location of the transponder at which the amplification is linear and where the gain as far as that location is incidentally known; then depointing the receive antenna relative to the reference pointing direction over a set of depointing angular positions of the receive antenna relative to the reference pointing direction and for each depointing angular position, generating on the ground during a predetermined time period the test thermal noise covering the receive band of the transponder and corresponding to the configuration of the at least one first amplifier at the reference density Dref; and measuring during a predetermined time period on one or more frequencies from the band of the transponder the relative directivity or the relative gain of the receive satellite antenna relative to the reference level corresponding to the depointing angular position of the receive satellite antenna, based on the test thermal noise signal retransmitted by the payload on the downlink and received by the ground station via a receive ground antenna when there exists an area of intersection of the coverage areas of the receive antenna and of the transmit antenna of the satellite and the ground station is in the said intersection area, or based on a telemetry measurement from the satellite supplying the receive power level at a location of the transponder where the amplification is linear and the gain as far as that location is known;
storing the commanded depointing angular offsets of the receive satellite antenna and the associated relative directivity or relative gain measurements; then
from the commanded depointing angular offsets of the receive satellite antenna and the associated single-frequency or multi-frequency relative directivity or relative gain measurements, reconstituting one or more angular patterns of variation of the directivity of at least one of the receive satellite antenna and one or more angular sections of variation of the directivity of the receive satellite antenna.

8. The method according to claim 1 of characterizing the performance of a payload, in which the transponder is a transparent transponder and
the characterization of the payload is the characterization of the gain response of the transponder from its input end to its output end over the receive band of the transponder following a predetermined gain command to the at least one second amplifier for which the transponder operates in linear mode when the test ground station generates a test thermal noise the power spectral density of which is equal to the reference power spectral density Dref; and the method comprises the steps:
pointing the receive satellite antenna at the test ground station according to a reference pointing direction; then
configuring the at least one second amplifier to fix the gain of the transponder at the predetermined gain value compatible with linear operation of the transponder when the ground station transmits the test thermal noise at the reference power spectral density Dref; and configuring the at least one first amplifier of the ground station to generate a thermal noise at the input of the transmit antenna covering the band of the transponder and causing the power spectral density of the test thermal noise to be varied in steps of predetermined duration in a range of attenuation relative to the reference spectral density Dref between 0 dB and a fallback value less than or equal to the first threshold Ds1 inclusive; and over a swept set of power densities of the thermal noise generated by the station, correlatively measuring the powers at the input of the transponder and the corresponding powers at the output of the transponder and deducing therefrom the evolution of the gain as a function of the input power of the transponder.

9. The method according to claim 1 of characterizing the performance of a payload, in which the transponder is a transparent transponder; and the characterization of the payload is the characterization of the frequency response of the gain over the entire band of the transponder following the same predetermined gain command applied to the at least one second amplifier for which the transponder operates in linear mode when the ground station generates a test thermal noise the power spectral density of which is equal to the reference power spectral density Dref; and the method comprises the steps:

pointing the receive satellite antenna at the test ground station according to a reference pointing direction; then configuring the at least one second amplifier to fix the gain of the transponder at a predetermined gain value compatible with linear operation of the transponder when the test ground station transmits the test thermal noise at the reference power spectral density; and configuring the at least one first amplifier of the test ground station to generate a thermal noise at the input of the transmit ground antenna covering the receive band of the transponder at the reference power spectral density Dref;

over a set of frequencies swept in steps of predetermined duration, correlatively measuring, the transmitted and received spectral densities as a function of frequency by the ground station via the receive ground antenna when there exists an area of intersection of the coverage areas of the receive antenna and of the transmit antenna of the satellite and the ground station is in the said intersection area; then deducing therefrom the gain variation as a function of frequency in the receive band of the transponder.

10. The method according to claim 1 of characterizing the performance of a payload, in which:

the transponder is a transparent transponder; and the characterization of the payload is the characterization of a saturating flux or of a saturating flux density (SFD) of the transponder of at least one of the satellite and the measurement of the EIRP (effective isotropic radiated power) of the payload; and the method comprises the steps:

pointing the receive antenna of the satellite at the ground station according to a reference pointing direction; then configuring the at least one second amplifier to cause the transponder to operate in a linear amplification regime when the power spectral density of the test thermal noise injected at the input of the transmit ground antenna is less than or equal to the reference power spectral density Dref;

configuring the at least one first amplifier of the ground station to generate a test thermal noise at the input of the transmit ground antenna covering the receive band of the transponder and causing the test thermal noise power spectral density to vary in steps of predetermined duration in a range of attenuation relative to the reference spectral density Dref between 0 dB and a backoff value less than or equal to the first threshold Ds1 inclusive; and over the swept set of power densities of the thermal noise generated by the ground station correlatively measuring either the corresponding input and output powers of the transponder via satellite telemetry measurements, or the input powers of the transponder via measurement at the level of the ground station or via the satellite telemetry measurement and the corresponding powers received by the ground station via the receive ground antenna when there exists an area of intersection of the coverage areas of the receive antenna and the transmit antenna of the satellite and the ground station is in said intersection area, and deducing therefrom the evolution of the EIRP (effective isotropic radiated power) of the payload as a function of the input power received by the transponder over a first observation range;

the method alternatively or additionally comprises the steps:

configuring the at least one first amplifier to fix the spectral density of the test thermal noise injected at the input of the transmit ground antenna and covering the total band of the transponder at the reference power spectral density Dref; then configuring the at least one second amplifier of the transponder by causing the linear gain of the transponder to vary in steps of predetermined duration in a range of gains of the transponder between the first lower gain value Gmin in and the second higher gain value Gmax inclusive to cause the transponder to operate in a non-linear mode in which a high-power amplifier forming one end of the at least one second amplifier is compressed; and over the swept set of the linear gain commands of the transponder correlatively measuring either the corresponding input and output powers of the transponder via satellite telemetry measurements, or the input powers of the transponder via measurement at the level of the ground station or via the satellite telemetry measurement and the corresponding powers received by the ground station via the receive ground antenna when there exists an area of intersection of the coverage areas of the receive antenna and of the transmit antenna of the satellite and the ground station is in said area of intersection, and deducing therefrom the evolution of the effective isotropic radiated power (EIRP) of the payload as a function of the gain of the transponder and the input power received at the input of the transponder corresponding to a spectral density of the test thermal noise transmitted to the ground equal to at least one of the reference spectral density Dref and to the saturating flux density (SFD).

11. The method according to claim 1 of characterizing the performance of a payload, in which:
the characterization of the payload is a measurement of the G/T in which G designates the gain of the antenna and T designates the noise temperature referred to the input of the transponder; and
when the transponder is transparent and there exists no intersection between the uplink coverage and the downlink coverage or the transponder is regenerative,
the method comprises the steps:
pointing the receive antenna of the satellite at the ground station according to a reference pointing direction;
switching off or leaving switched off the transmission of radio-electric signals by the ground station; then
configuring the at least one second amplifier of the transponder at a gain value compatible with linear operation of the transponder and a measurement of noise via a satellite telemetry measurement; then
measuring the thermal noise N1 inherent to the transponder present at the input of the transponder via the input telemetry measurement of the transponder; then
activating the ground station and configuring the at least one first amplifier to generate a test thermal noise the spectral density of which measured on the ground is greater than or equal to the reference density Dref; then
measuring a received thermal noise N2 coming from the ground station and at the input of the transponder in the receive band of the transponder via the input telemetry measurement of the transponder;
determining the ratio G/T from the ratio of the received thermal noise N2 to the thermal noise N1 inherent to the transponder.

12. The method according to claim 1 of characterizing the performance of a payload, in which:
the characterization of the payload is a measurement of the G/T in which G designates the gain of the antenna and T designates the noise temperature referred to the input of the transponder; and
when the transponder is transparent and there exists an intersection between the uplink coverage and the downlink coverage,
the method of measuring the G/T comprises the steps:
pointing the receive antenna of the satellite at the ground station according to a reference pointing direction;
switching off or leaving switched off the transmission of radio-electric signals by the ground station; then
configuring the at least one second amplifier of the transponder at a gain value compatible with linear operation of the transponder; then
measuring the inherent thermal noise N1 on the downlink; then
activating the ground station and configuring the at least one first amplifier to generate a test thermal noise the spectral density of which measured on the ground is greater than or equal to the reference density Dref; then
measuring a thermal noise N2 received on the downlink; then
determining the ratio G/T from the ratio of the measured thermal noise N2 to the inherent thermal noise N1 of the transponder.

13. A system for characterizing the performance of a payload of a satellite in orbit over a frequency band and on an uplink, comprising:
the payload of the satellite including a first receive satellite antenna for the uplink, a second transmit satellite antenna for the downlink, and a wide-band transponder connected between the first receive satellite antenna and the second transmit satellite antenna,
the transponder including a radio-frequency input port connected to an output port of the receive satellite antenna, and at least one second amplifier, configured to amplify in an input portion of the transponder corresponding to the uplink or in the whole of the transponder signals in the band, according to a linear amplification mode and with a fixed gain that can be telecommanded included in a gain range varying between a first lower gain Gmin and a second higher gain Gmax inclusive, and
the system comprising:
a test ground station including at least one first radio-frequency amplifier and a radio-frequency transmit ground antenna with an input port connected to an output of the at least one first amplifier;
a telecommand and telemetry measurement infrastructure of the payload and of the satellite platform terminated by a telecommand and telemetry measurement station visible from the satellite; and
a test bench connected to the test ground station and to the telecommand and telemetry measurement infrastructure configured to implement the method according to claim 1 of characterizing the payload by coordinating the sending of commands and the reception of signals to be at least one of measured and telemetry measurements respectively sent to the test ground station and received from the telecommand and telemetry measurement station;
the system being characterized in that in that:
the at least one first amplifier of the ground station being configured to generate at the input of the transmit ground antenna a test thermal noise, the test thermal noise having a bandwidth greater than or equal to the receive band of the receiver and the power spectral density of which is adjusted to a reference power spectral density Dref such that the ratio of the density of the test thermal noise received from the test ground station when it transmits is equal to the reference spectral density Dref, and received at the input of the transponder, to the thermal noise floor spectral density generated by the satellite alone internally and by the natural thermal noise of the Earth at the input of the transponder, is greater than or equal to a first threshold Ds1 equal to 10 dB.

14. The system according to claim 13, for characterizing the performance of a payload, wherein:
the test bench is configured to acquire during a predetermined time period the thermal noise transmitted by the transmit satellite antenna on the downlink received by the test ground station when there exists an area of intersection of the coverage areas of the receive antenna and of the transmit antenna of the satellite and the ground station is in at least one of said intersection area and telemetry measurements of the test thermal noise received at various locations of the transponder, and telemetry measurements from the platform representing the RF power withstanding of at least one of the payload, the electrical consumption, and the thermal performance of the platform when the payload is loaded by test thermal noise in a configuration close to the operational conditions, for example that of a maximum traffic or a traffic variable in time;

the test bench is configured to telecommand at least one of the payload and the platform of the satellite in service orbit, during said predetermined time period, to impart a pointing angular offset of the receive satellite antenna relative to a reference pointing direction of at least one of predetermined variation and to vary a linear gain of the transponder when it is in a linear amplification mode or to command a non-linear amplification mode of the transponder by activating an automatic gain control loop at the input of an output high-power amplifier;

the test bench is configured to store variations commanded by the telecommand of the test bench;

the test bench is configured to correlate the measurement of the signal by the transmit satellite antenna on the downlink of the satellite when there exists an area of intersection of the coverage areas of the receive antenna and of the transmit antenna of the satellite and the ground station is located in at least one of the withstanding, telemetry measurements of the test signal received at various locations of the transponder; and other satellite parameters related to the payload representing the RF power behaviour of the payload, and performance in terms of consumption and thermal regulation of the platform, and for deducing therefrom the measured parameter variations characterizing the payload or the platform as a function of the variations commanded to the satellite.

\* \* \* \* \*